(12) United States Patent
Anderson

(10) Patent No.: US 8,550,539 B1
(45) Date of Patent: Oct. 8, 2013

(54) AERODYNAMIC DRAG REDUCER FOR VEHICLES

(76) Inventor: Lawrence Everett Anderson, Arlington, VA (US)

( * ) Notice: Subject to any disclaimer, the term of this patent is extended or adjusted under 35 U.S.C. 154(b) by 0 days.

(21) Appl. No.: 13/567,082

(22) Filed: Aug. 5, 2012

(51) Int. Cl.
*B62D 35/00* (2006.01)

(52) U.S. Cl.
USPC ................. 296/180.4; 296/180.1

(58) Field of Classification Search
USPC .......................... 296/180.4, 180.1
See application file for complete search history.

(56) References Cited

U.S. PATENT DOCUMENTS

| | | | | |
|---|---|---|---|---|
| 7,147,270 | B1 * | 12/2006 | Andrus et al. | 296/180.5 |
| 7,850,224 | B2 * | 12/2010 | Breidenbach | 296/180.1 |
| 2010/0164249 | A1 * | 7/2010 | Nusbaum | 296/180.4 |
| 2010/0181799 | A1 * | 7/2010 | Ryan et al. | 296/180.4 |
| 2011/0037291 | A1 * | 2/2011 | Pickering | 296/180.4 |

OTHER PUBLICATIONS

Visser, K., "Tractor Trailer Drag Reduction," Ken Visser Research Page, Clarkson University, Department of Mechanical & Aeronautical Engineering (2010). http://people.clarkson.edu/~kvisser/research/drag/truck/index.html.
Clark, Robert M., "Truck Manufacturers Program to Reduce Aerodynamic Drag" Truck Manufacturers Association, DOE Heavy Vehicle Systems Optimization Merit Review, Apr. 2006.
Trailer Tail™ available from AeroRig Solutions, advertised at http://aerorigsolutions.com/.(2011).
Gast Precision Air-moving Products, Section IV, Vacuum Pumps, pp. 69-85, http:/Iwww.gastmfg.com/vphb/vphb_s4.pdf (2012).

* cited by examiner

*Primary Examiner* — Joseph Pape
*Assistant Examiner* — Dana Ivey

(57) ABSTRACT

An apparatus for converting a substantially flat vehicular surface on the rear of a vehicle so as to create at least one surface which operates to reduce aerodynamic drag, comprising: at least one support adapted to be moveably attached to the rear surface of a vehicle; at least one surface supported by the at least one support; the at least one surface movably position so as to move from deployed position extending from the rear of a vehicle to a retracted position; whereby the apparatus operates to reduce aerodynamic drag in the deployed position and does not interfere with vehicle loading in the retracted position.

5 Claims, 44 Drawing Sheets

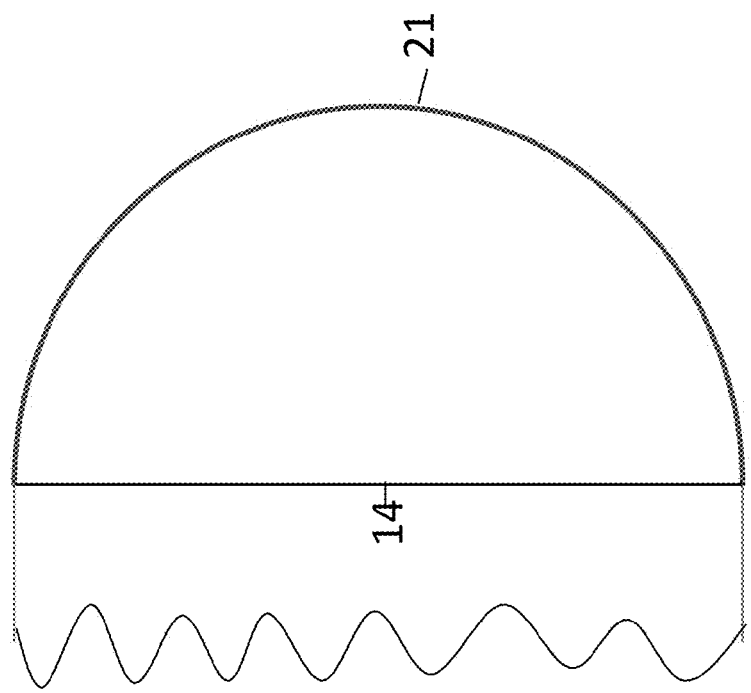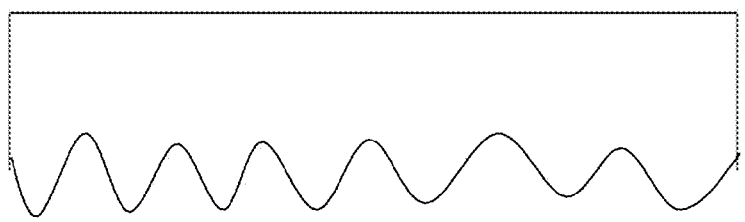
FIG. 5

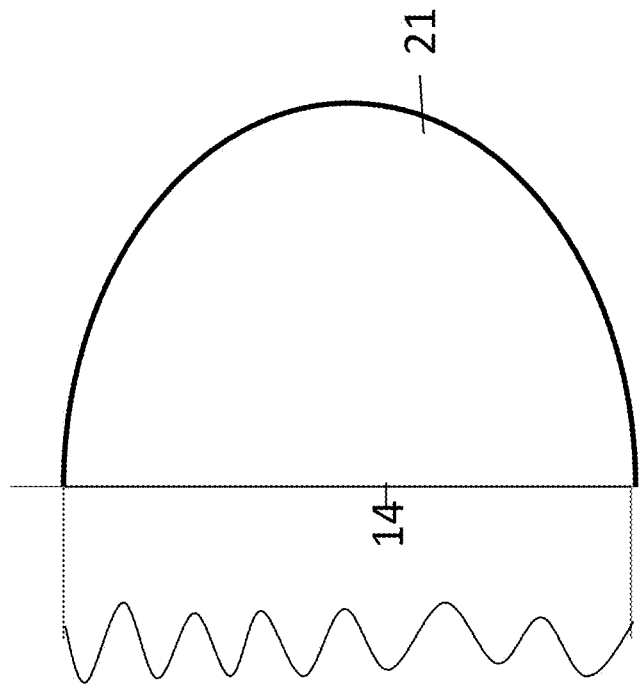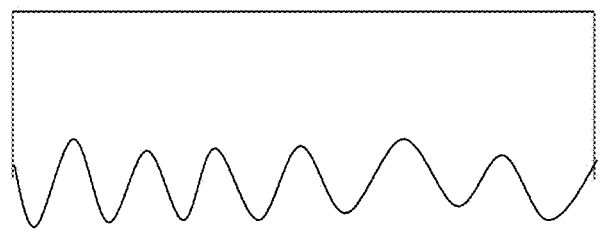
FIG. 6

FIG. 27 SIDE VIEW

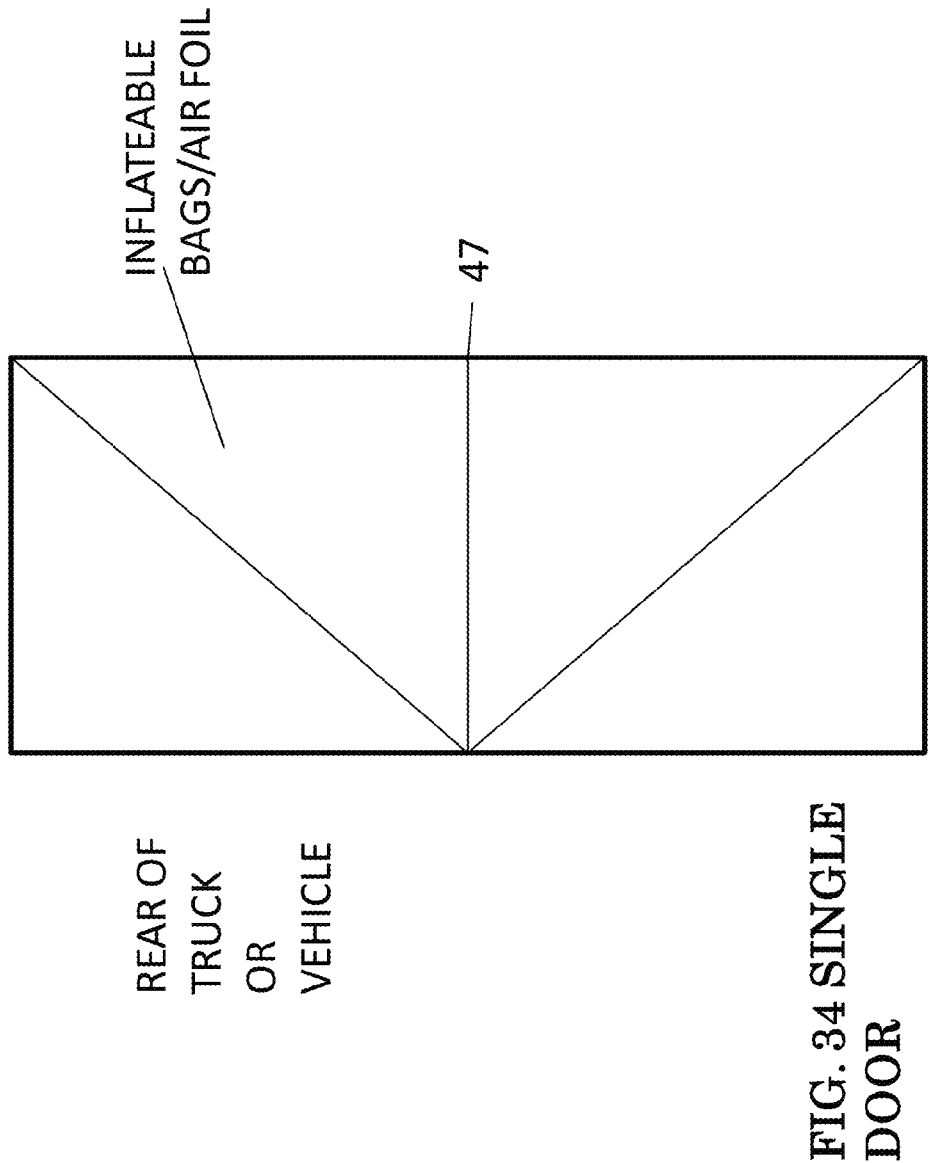
FIG. 34 SINGLE DOOR

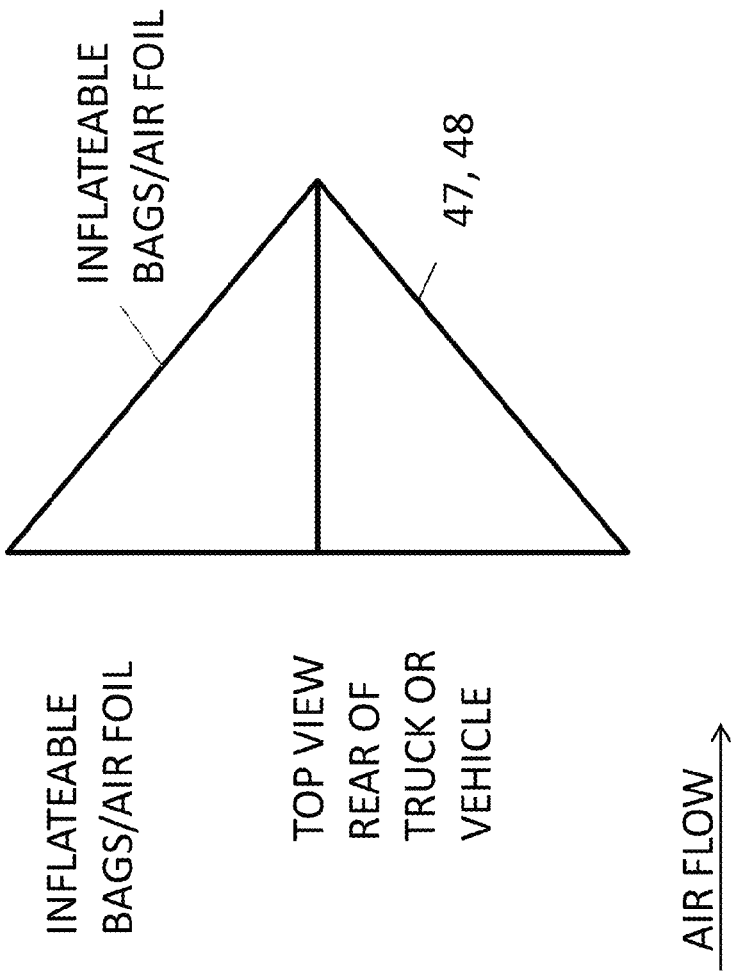
FIG. 35 TOP VIEW

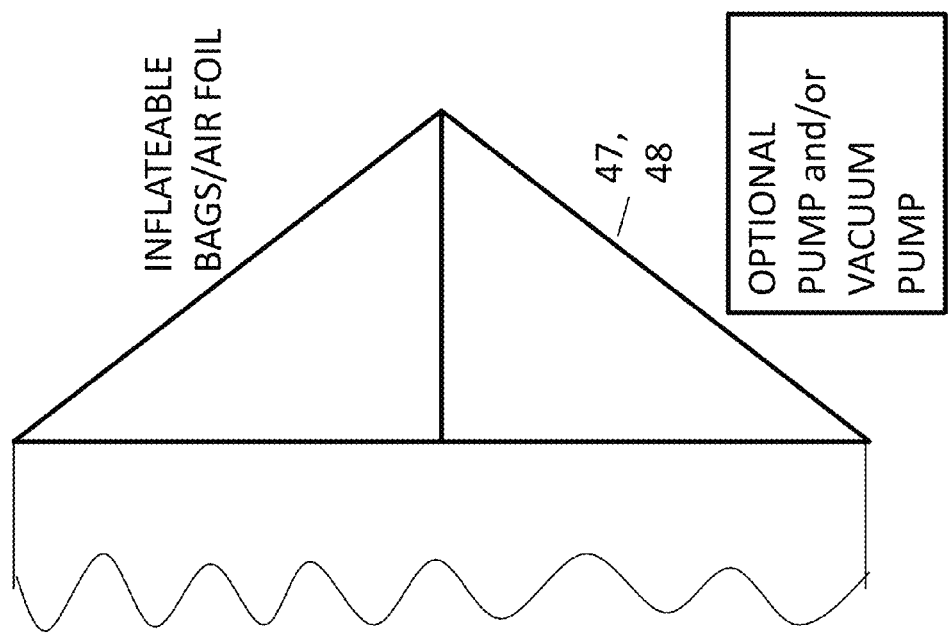
FIG. 36 SIDE VIEW

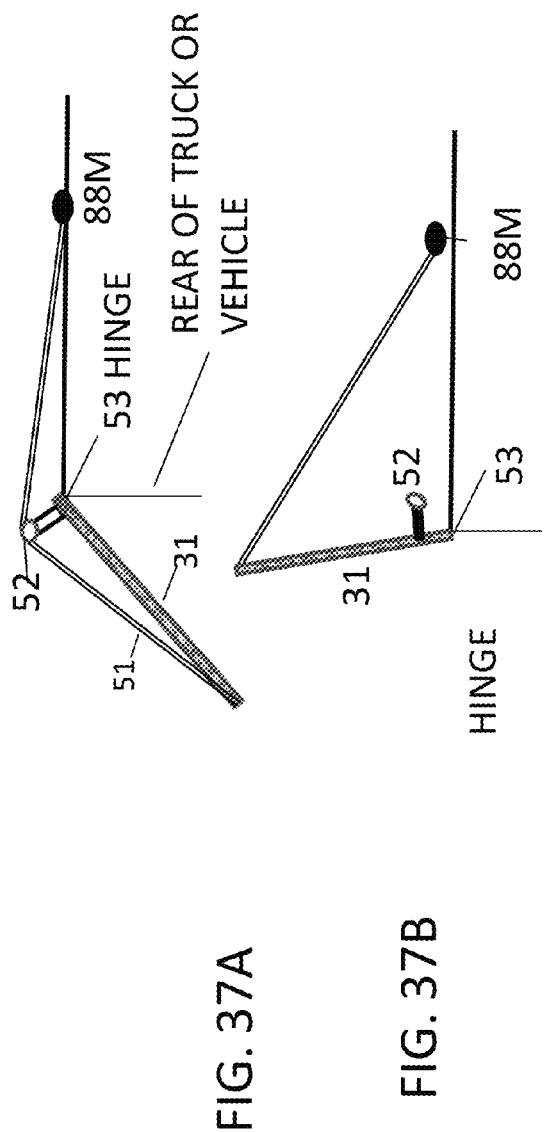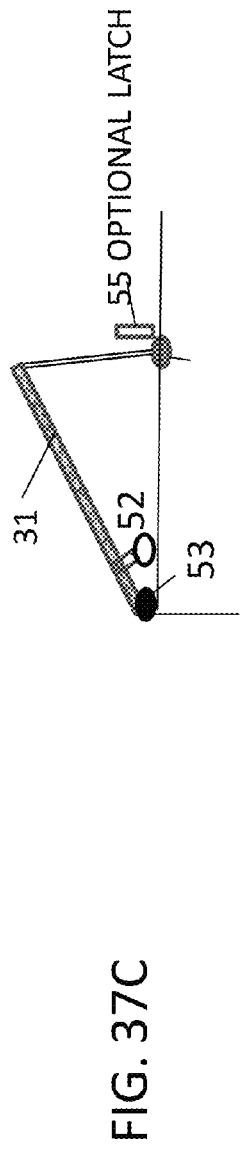
FIG. 37A
FIG. 37B
FIG. 37C
FIG. 37D

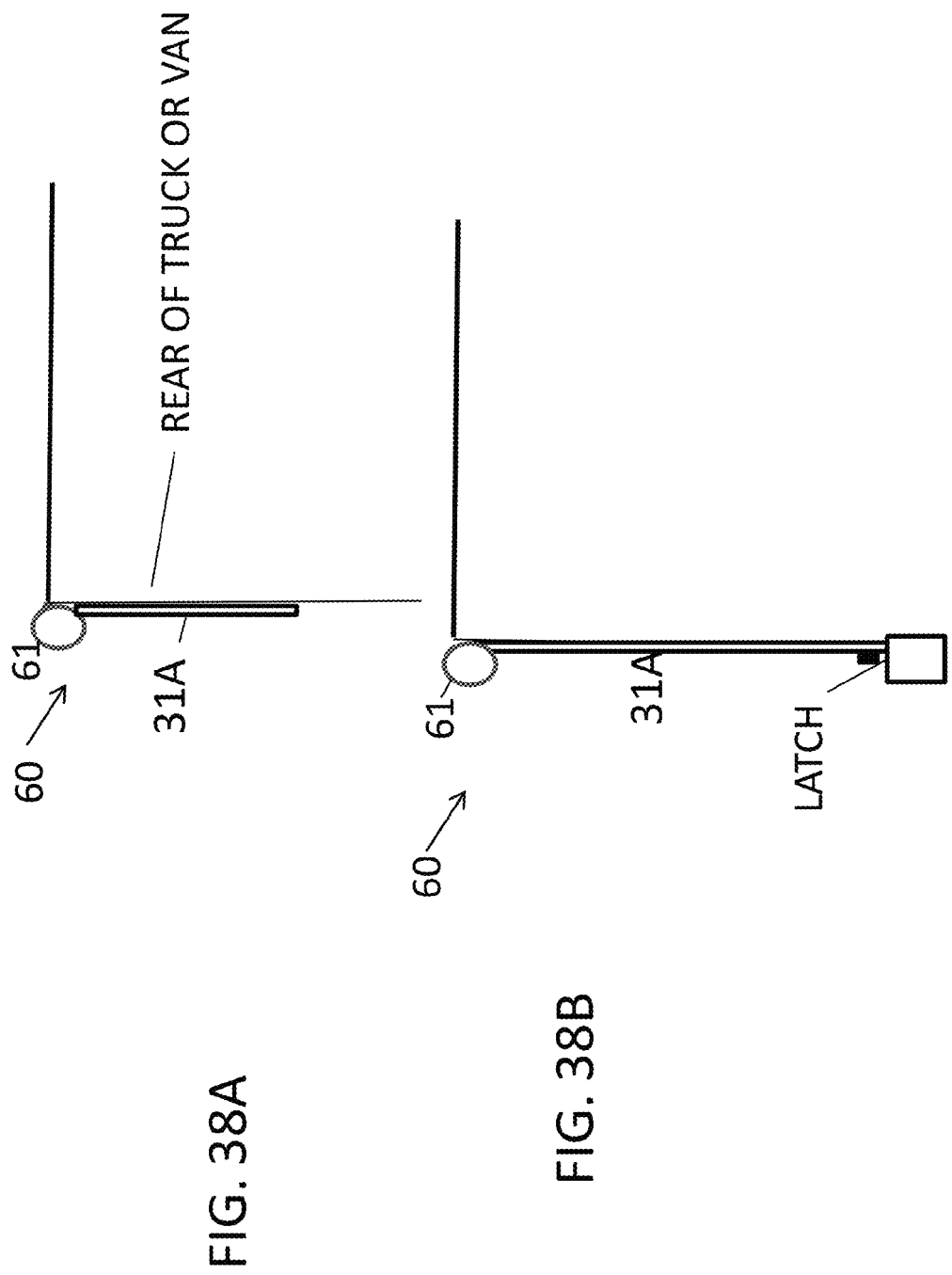

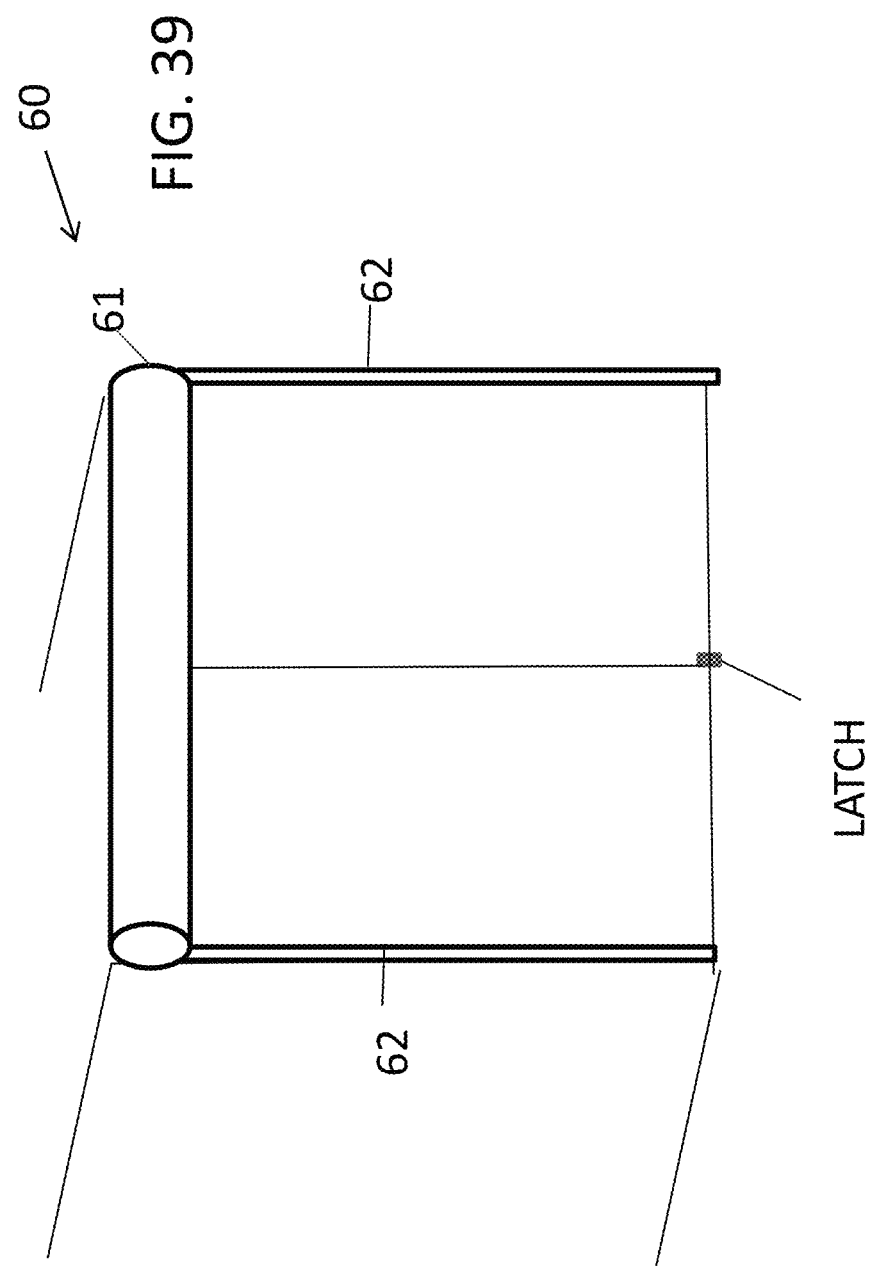

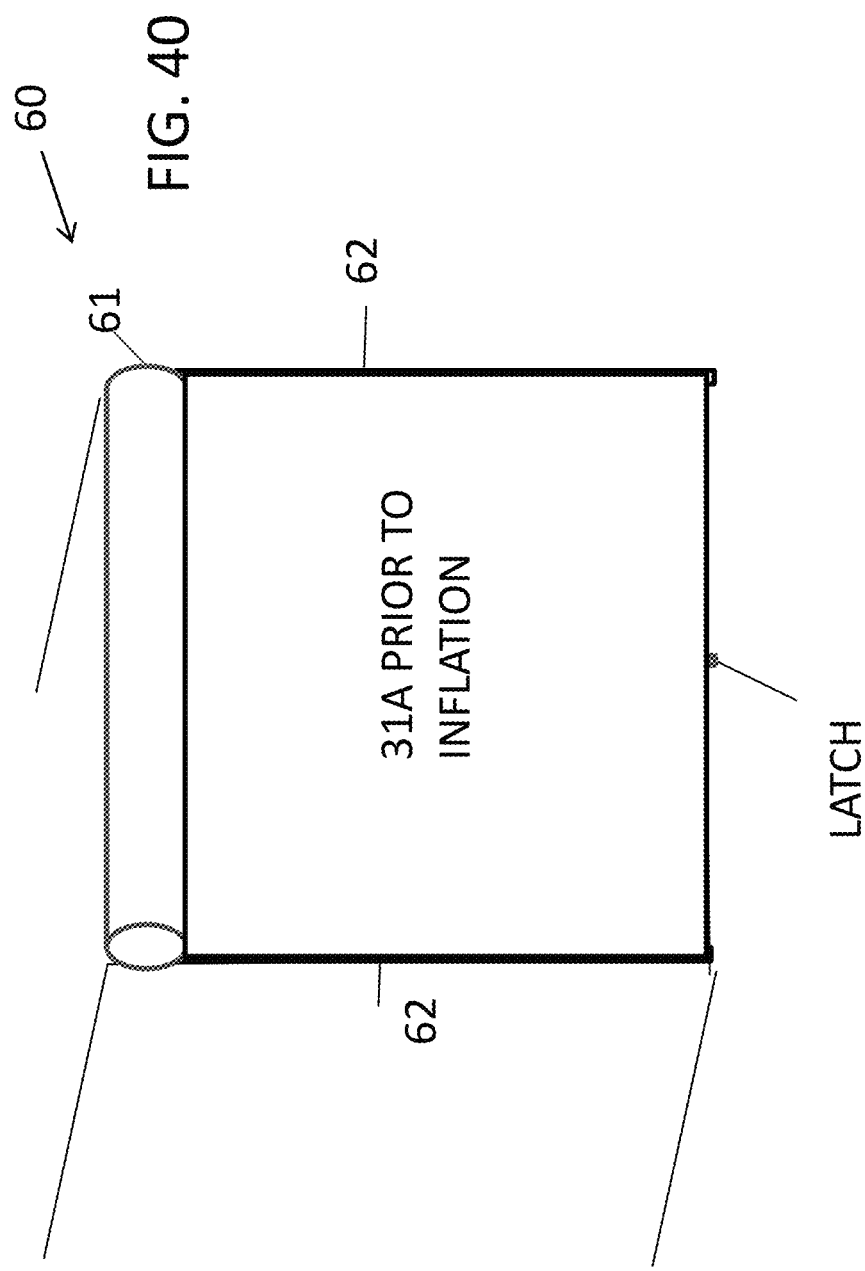

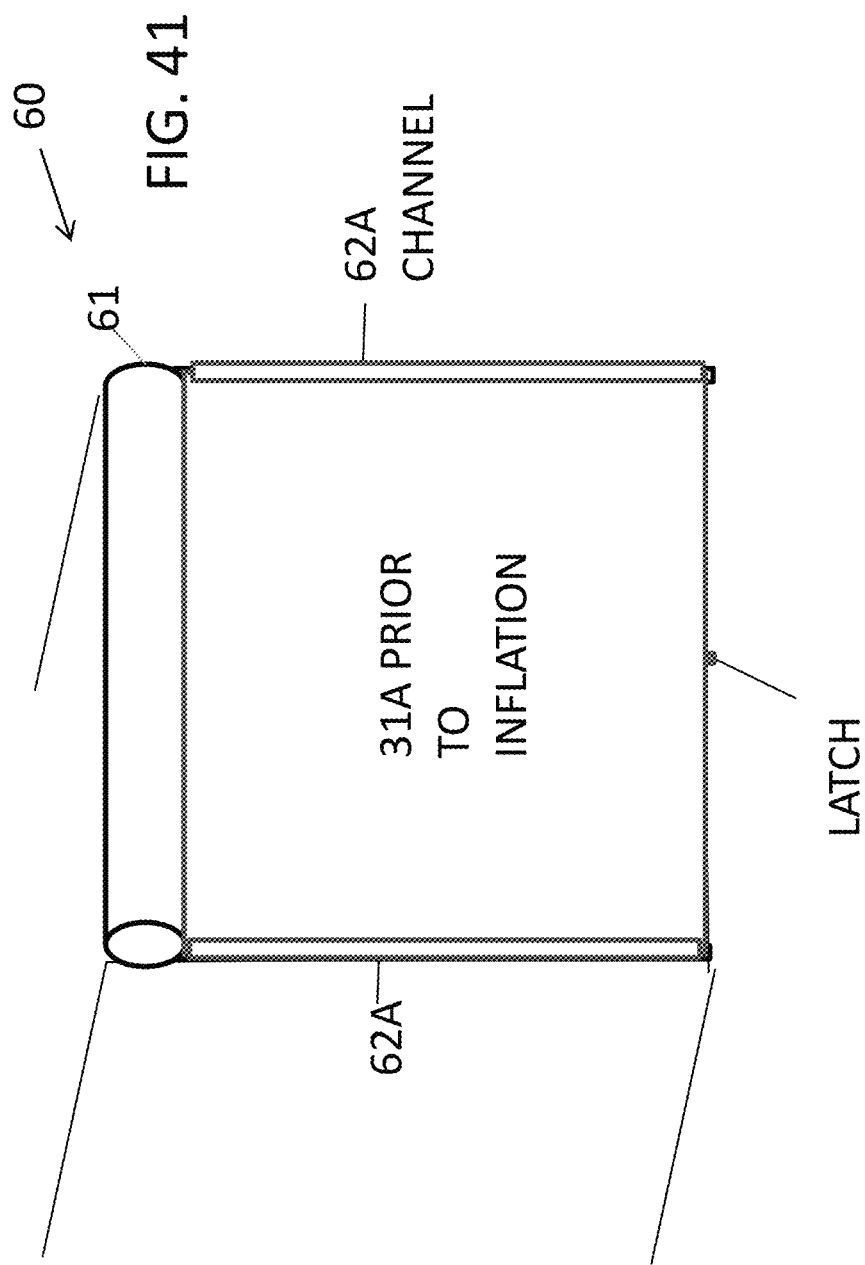

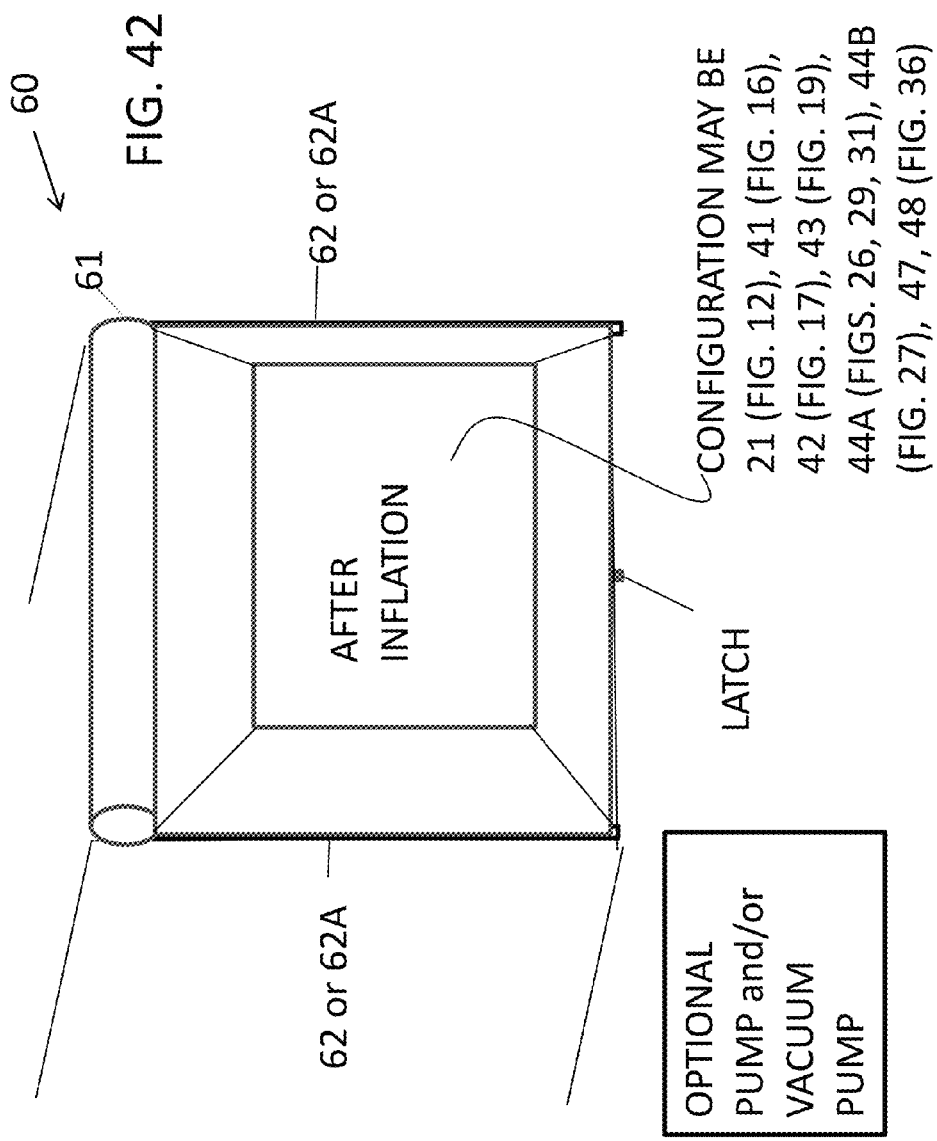

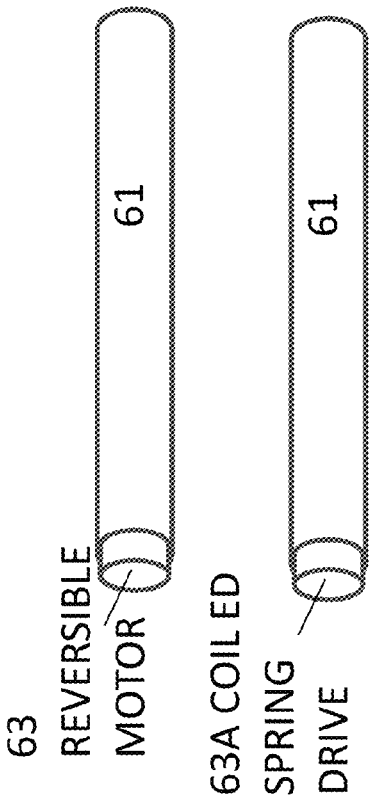
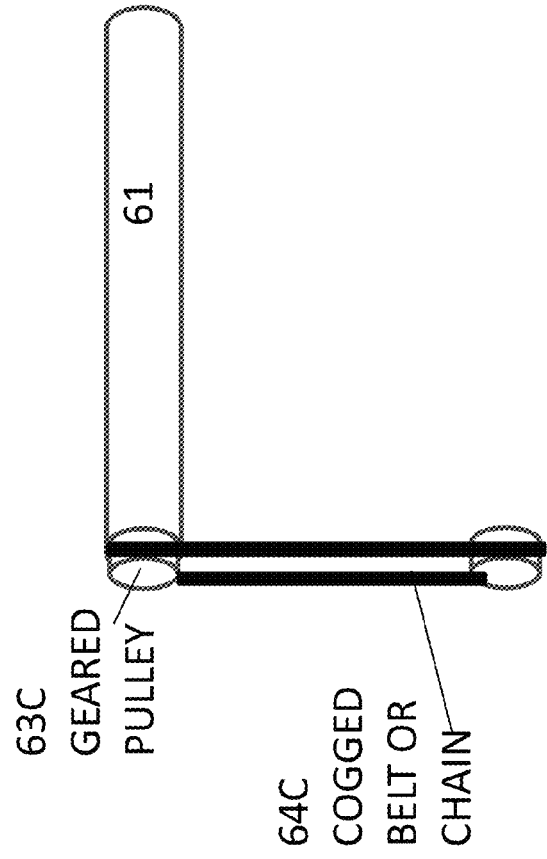
FIG. 44A
FIG. 44B
FIG. 44C

AERODYNAMIC DRAG REDUCER FOR VEHICLES

BACKGROUND OF THE INVENTION

Various air foils have being used to reduce drag on tractor-semi trailer systems (or eighteen wheelers). For instance, truck cabs commonly have an air foil on top of the cab for air flow to reduce drag. Trailer Tail™ available from AeroRig Solutions provides an extension on the rear of a truck to reduce drag as advertised at http://aerorigsolutions.com/. Another example is the "Boat tail" from Clarkson University. Further examples of efforts to reduce truck aerodynamic drag are found at "Truck Manufacturers Program to Reduce Aerodynamic Drag" by Robert M. Clark, ClarkeTruck Manufacturers Association, Further examples are found in DOE Heavy Vehicle Systems Optimization Merit Review, April 2006. However, the truck extensions of the prior art appeared to fixedly and/or manually implemented and produce hazardous conditions in that extensions to the back of a truck may result in increased frequency of accidents and bumping of the trailer and inhibits use during loading and unloading.

SUMMARY OF THE PRESENT INVENTION

A preferred embodiment apparatus for converting a substantially flat vehicular surface on the rear of a vehicle so as to create at least one surface which operates to reduce aerodynamic drag, comprising: at least one support adapted to be moveably attached to the rear surface of a vehicle; at least one surface supported by the at least one support; the at least one surface movably positioned so as to move from deployed position extending from the rear of a vehicle to a retracted position; whereby the apparatus operates to reduce aerodynamic drag in the deployed position and does not interfere with vehicle loading in the retracted position.

A preferred embodiment provides a removable and/or movable extension behind a truck, bus, van or similar vehicle which becomes operative at speeds above a certain minimum. One preferred embodiment extends from the rear of a vehicle to effectively produce the tail of a "tear drop" shaped extension.

A preferred embodiment provides a truck or vehicle extension which optionally collapses automatically at low speeds and extends at high speeds when most beneficial. A preferred embodiment extension is minimal in size at slow speeds or stand still, when interference with other vehicles is a possibility. Extension at higher speeds provides limited interference with traffic conditions and vehicular maneuvering.

A preferred embodiment provides a self inflating actuation in which air flow enters the cavity, and extends the cavity to a desired shape to create an aerodynamic effect.

To achieve an aerodynamic effect, an extension is mounted to the rear of a vehicle which extends from the vehicle rear at speeds when the aerodynamic effect is achieved. Optionally, at low speeds or a stand still, the extension recedes or collapses so as to not to interfere with parking of the vehicle or interfere with other vehicles. At deployment speeds, vehicles are commonly spaced from one another in traffic, so the extension does not provide interference. Yet in bumper to bumper traffic, the extension may optionally recede to facilitate traffic maneuvering. The extension promotes laminar flow and reduces the effects of drag.

Deployment from the top of the vehicle or retract ability results in less interference with the opening of the trailer doors and loading unloading of the trailer.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 2 is a schematic illustration of the preferred embodiment of pivoted to the top of the vehicle having collapsible links or elements 17A, 18A.

FIG. 5 is a schematic side view illustration of a preferred embodiment vehicle extender comprising an inflatable chamber 21.

FIG. 6 is a schematic top view illustration of the preferred embodiment of FIG. 5.

FIG. 34 is a schematic illustration of the preferred embodiment vehicle extender 47 showing only a single trailer door of the embodiment of FIG. 32.

FIG. 35 is a top view of a schematic illustration of the preferred embodiment vehicle extender 48 positioned on trailer doors.

FIG. 36 is a side view of a schematic illustration of the preferred embodiment vehicle extender 48 positioned on trailer doors.

FIG. 37A is a side view of a schematic illustration of the preferred embodiment vehicle extender showing a motor driven lifting assembly.

FIG. 37B is a side view of a schematic illustration of the preferred embodiment vehicle extender of FIG. 37A in a lifted position.

FIG. 37C is a side view of a schematic illustration of the preferred embodiment vehicle extender of FIG. 37A in a ¾ lifted position.

FIG. 37D is a side view of a schematic illustration of the preferred embodiment vehicle extender of FIG. 37A in a retracted position.

FIG. 38A is a side view of a schematic illustration of the preferred embodiment vehicle extender showing cylindrical assembly 60, 61.

FIG. 38B is a side view of a schematic illustration of the preferred embodiment vehicle extender of FIG. 38A in a deployed position.

FIG. 39 a perspective view of a schematic illustration of the preferred embodiment vehicle extender of FIG. 38A.

FIG. 40 a perspective view of a schematic illustration of the preferred embodiment vehicle extender of FIG. 38A prior to inflation.

FIG. 41 a perspective view of a schematic illustration of the preferred embodiment vehicle extender of FIG. 38A prior to inflation showing channels 62A.

FIG. 42 a perspective view of a schematic illustration of the preferred embodiment vehicle extender of FIG. 38A after inflation; the configuration may be any one of 21, 41, 42, 43, 44A, 44B, 47, 48, and the chamber may be inflated by an air inlet, such as for example, as shown in FIG. 12 or a pump.

FIG. 44A is a schematic illustration of an assembly 61 comprising a reversible motor 63.

FIG. 44B is a schematic illustration of an assembly 61 comprising a coiled spring drive 63A.

FIG. 44c is a schematic illustration of an assembly 61 comprising a cogged drive 63B.

DETAILED DESCRIPTION OF PREFERRED EMBODIMENTS

Figure 1:
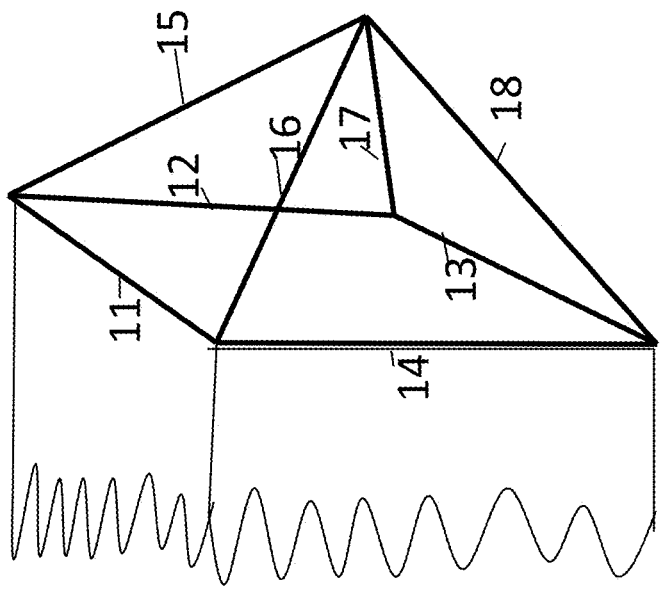
FIG. 1 is a schematic illustration of a preferred embodiment comprising supports 11, 12, 13, 14, 15, 16, 17, and 18 interconnected by a covering, such as plastic.

The invention now will be described more fully hereinafter with reference to the accompanying drawings, in which embodiments of the invention are shown. This invention may, however, be embodied in many different forms and should not be construed as limited to the embodiments set forth herein.

Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," "left" or right" may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Shown in FIG. 1 is a truck tail extender in the deployed position. The extender comprises supports 11, 12, 13 and 14 which may conform or track the shape of the rear of the vehicle, which in the FIG. 1 example is a truck. The supports 11, 12, 13 and 14 may comprise a rigid frame. It is intended that a covering extend between supports 11, 15, 16; supports 12, 17, 15, supports, 13, 17, 17, and supports 14, 15, 16. The covering may be, for example, plastic, or canvas. In addition supports 15 and 16 may form a rigid frame also. Supports 17 and 18 may be telescopic or extendable.

Figure 2:
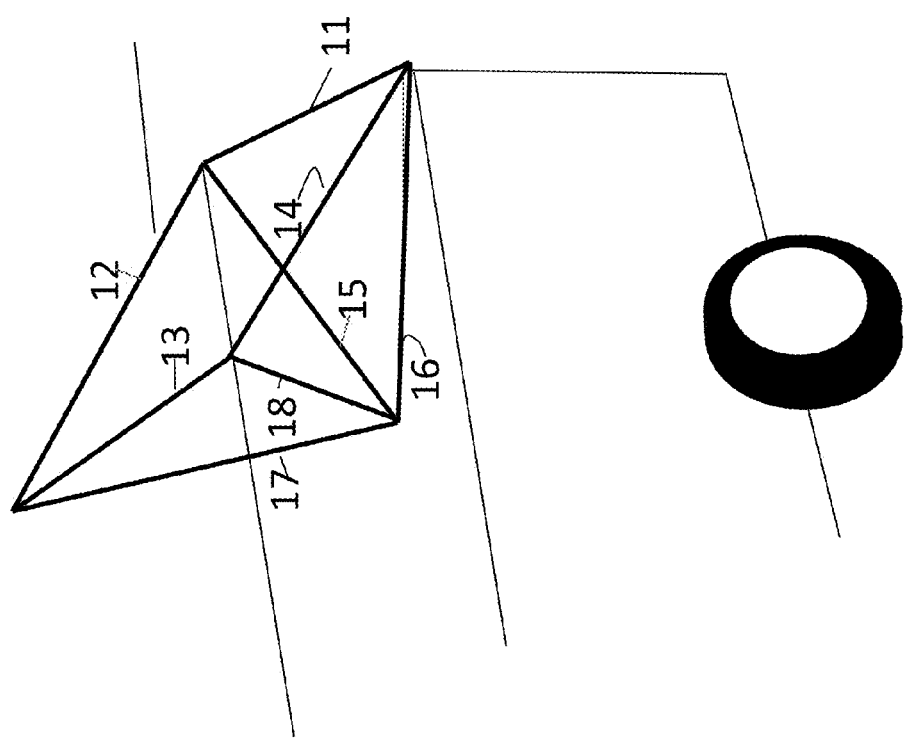
FIG. 2 is a schematic illustration of the preferred embodiment of FIG. 1 pivoted to the top of the vehicle.
Figure 3:
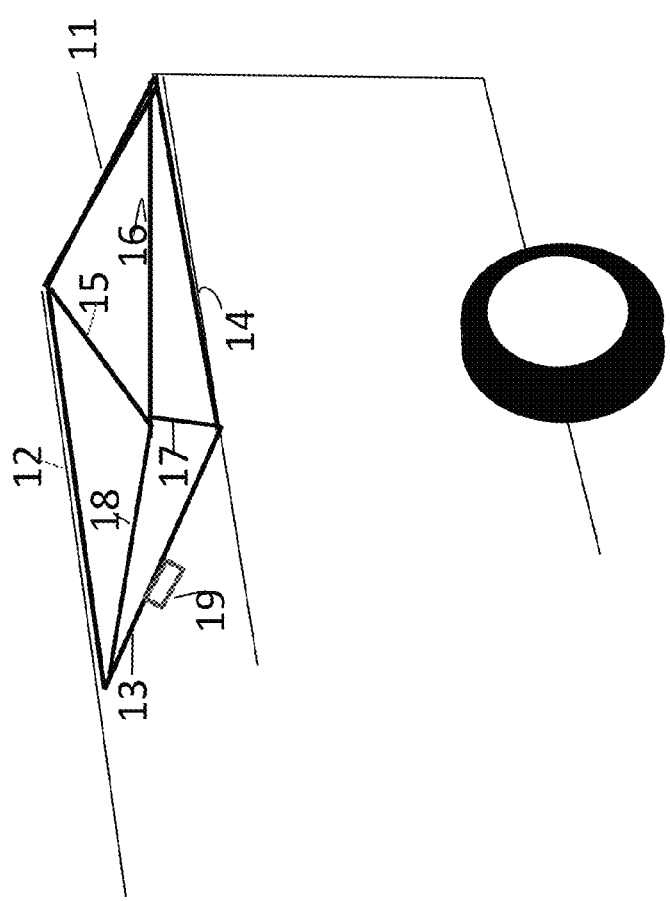
FIG. 3 is a schematic illustration of the preferred embodiment of FIG. 1 pivoted to the top of the vehicle in a collapsed state.

Shown in FIG. 2 is the extender in a pivoted position on the trailer or vehicle roof. The section defined by supports 11, 15, and 16 may lie against the trailer top. The support 11 may be similar to an axle upon which the extender 10 pivots. The section defined by supports 11, 15 and 16 may remain rigid while the supports 17 and 18 collapse to a position near the truck top. Supports 17, 18 may be telescopic so as to position the support 13 relatively close to the top of the vehicle. Optionally the extender comprises a latch 19. In between the supports 11, 15, and 16 may be clear plastic.

Figure 4:
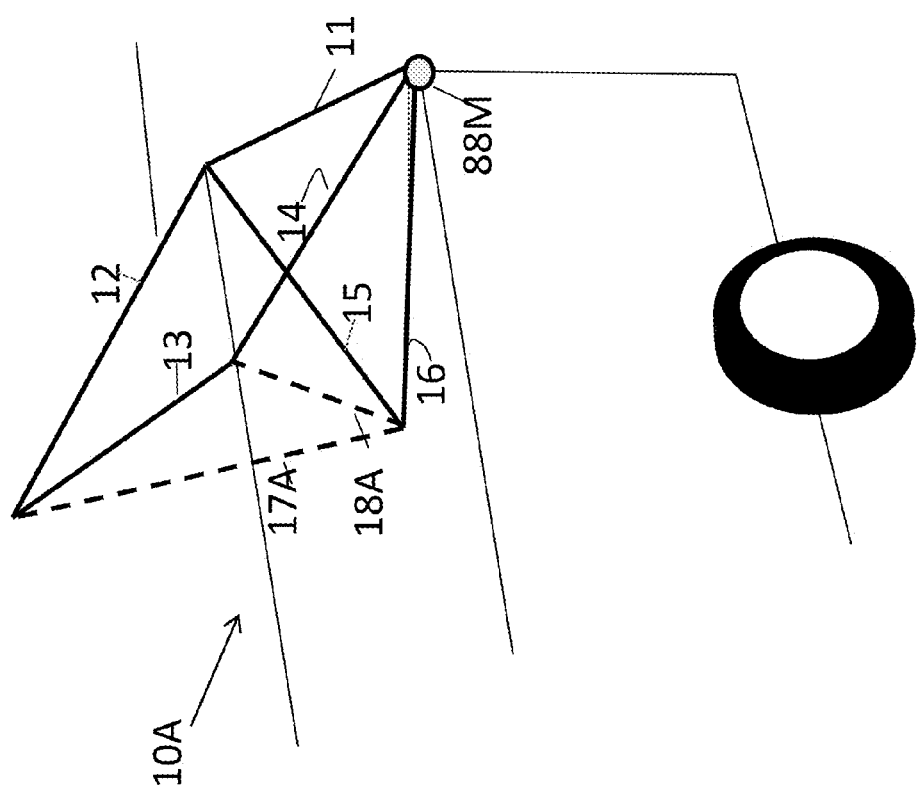
FIG. 4 is a schematic illustration of a preferred embodiment

In the preferred embodiment 10A of FIG. 4, supports 17 and 18 are formed by the corners 17A and 18A of an inflatable enclosure resembling a bag formed of clear plastic or the like. The bag resembles a triangular prism. Frame 11, 12, 13, 14 is rigid and surrounds the plastic inflatable enclosure. Frame 11, 12, 13, 14 is pivotable upon an axle or the like and may be pivoted by a motor 88M, which may be positioned to either side (or motors on both sides) or in the interior of the corners of the trailer. The motor may be electrically controlled from the vehicle cab.

Conversely in the summer time, an infrared sensing device may be positioned on the inside of an apartment unit or building. If a window or door is opened, the heat will be sensed by the infrared sensor.

FIG. 5 is a schematic side view illustration of a preferred embodiment vehicle extender comprising an inflatable chamber 21. The inflatable chamber may be formed of an elastic material, expandable plastic or the like. Alternatively, it may be formed of the material used for air bags. Although supports 11, 12, 13, and 14 are pictured in FIGS. 5-8 the inflatable chamber may be fastened to the end of the vehicle.

FIG. 6 is a schematic top view illustration of the preferred embodiment of FIG. 5.

Figure 7:
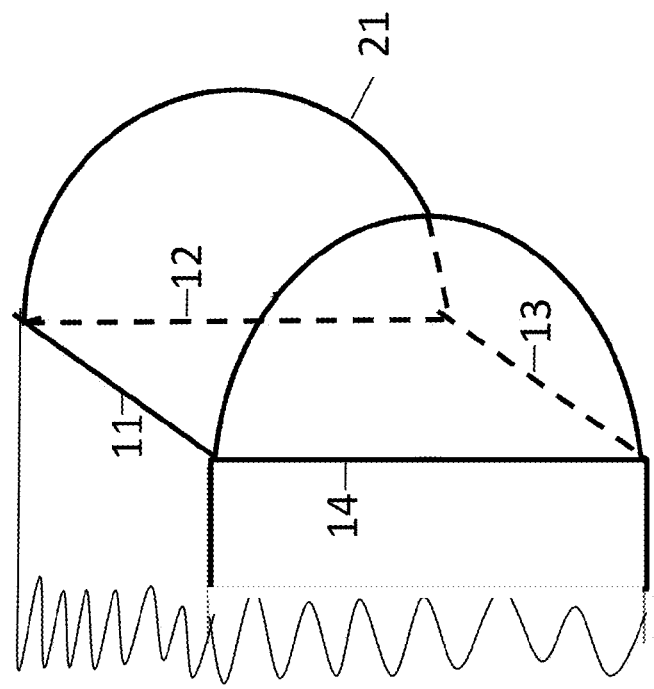
FIG. 7 is a schematic illustration of a preferred embodiment vehicle extender comprising an inflatable chamber 21.

FIG. 7 is a schematic illustration of a preferred embodiment vehicle extender comprising an inflatable chamber 21.

Figure 8:
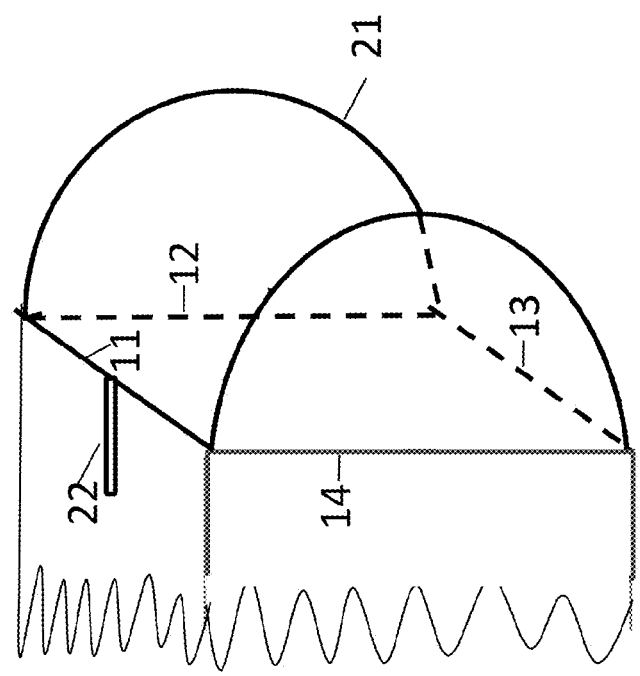
FIG. 8 is a schematic illustration of a preferred embodiment vehicle extender comprising an inflatable chamber 21 and an air intake 22.

FIG. 8 is a schematic illustration of a preferred embodiment vehicle extender comprising an inflatable chamber 21 and an air intake 22. The air intake may be covered when the extender is not deployed and is uncovered upon deployment of the extender on the back of the vehicle.

Figure 9:
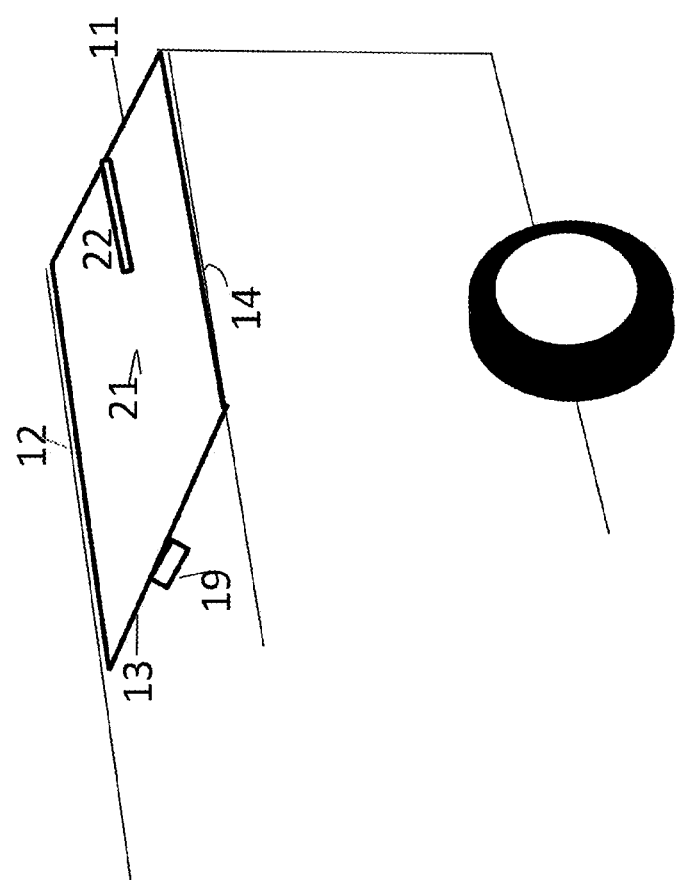
FIG. 9 is a schematic illustration of a preferred embodiment vehicle extender comprising an inflatable chamber 21 and an air intake 22 in a position on top of the vehicle.

FIG. 9 is a schematic illustration of a preferred embodiment vehicle extender comprising an inflatable chamber 21 and an air intake 22 in a position on top of the vehicle. The air intake may be covered when the extender is not deployed and is uncovered upon deployment of the extender on the back of the vehicle.

Figure 10:
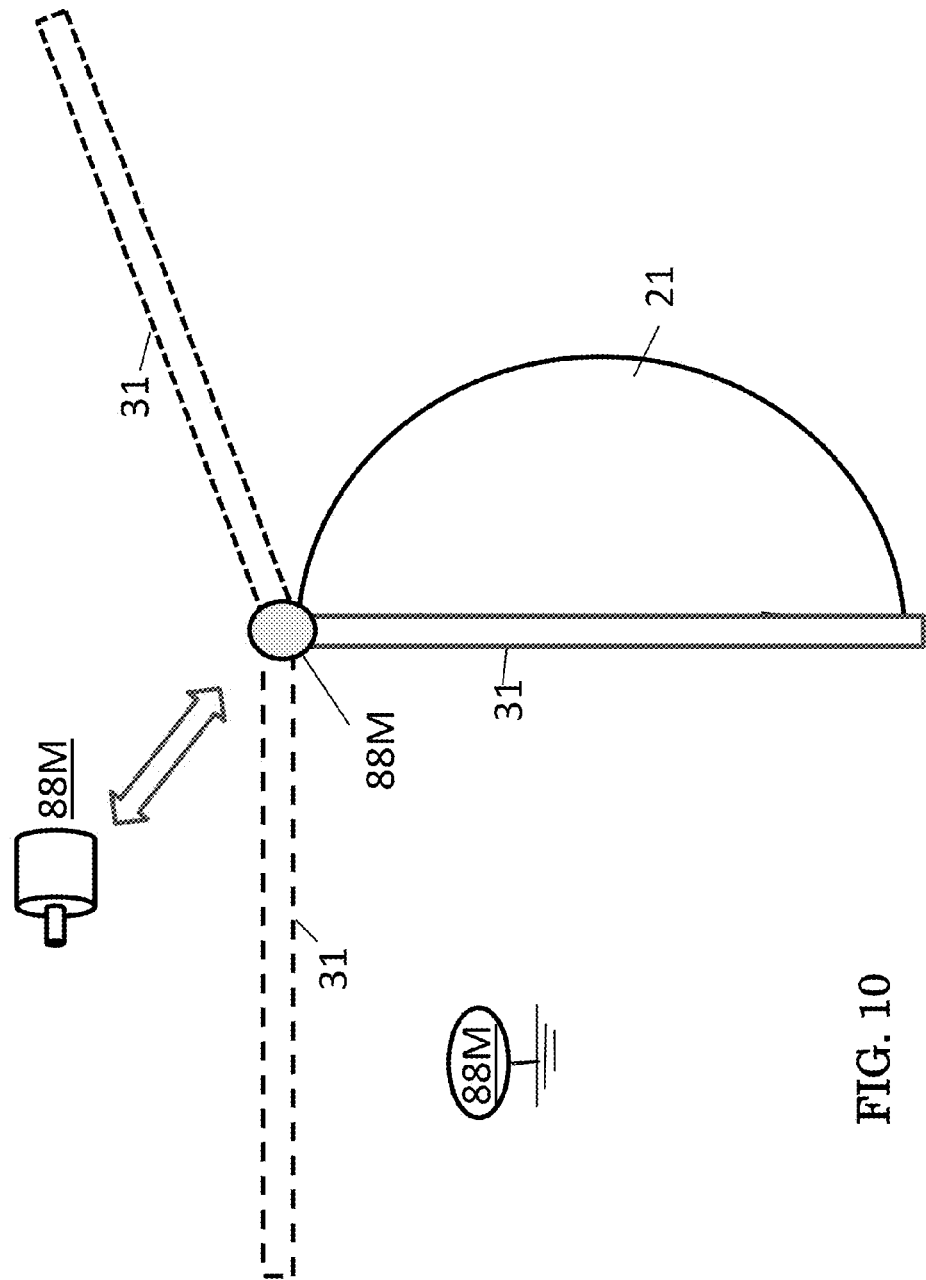
FIG. 10 is a schematic illustration of a preferred embodiment vehicle extender comprising an inflatable chamber 21 and an air intake 22 incrementally shown from a deployed position to in a position on top of the vehicle; optionally driven by a motor 88M.

FIG. 10 is a schematic illustration of a preferred embodiment vehicle extender comprising an inflatable chamber 21 and an air intake 22 incrementally shown from a deployed position to in a position on top of the vehicle; optionally driven by a motor 88M. The motor 88M may be reversible and controlled from the interior of the vehicle either by wire or a radio (or blue tooth) connection. The air chamber may be supported by a support 31 which may comprise a flat panel, sheet or a plurality of elements arranged in a frame-like matter. The support 31 is pivotable from a deployed position shown in solid lines and to a retracted position substantially parallel to the top surface of the vehicle. Positioning of the support surface 31 close and parallel to the top surface of the vehicle prevents interference when the vehicle passes underneath a bridge or sign. Upon positioning in a deployed position, the inflatable chamber 21 may be inflated by a pump or by airflow entering from the exterior. Optionally an outlet may be operatively connected to the chamber 21 for release of the air. A programmable controller or processor may be used to operate the motor, such that the motor is operated only when the vehicle is stopped and there is clearance for movement of the support 31. Clearance detection may be accomplished through a detector.

Figure 11:
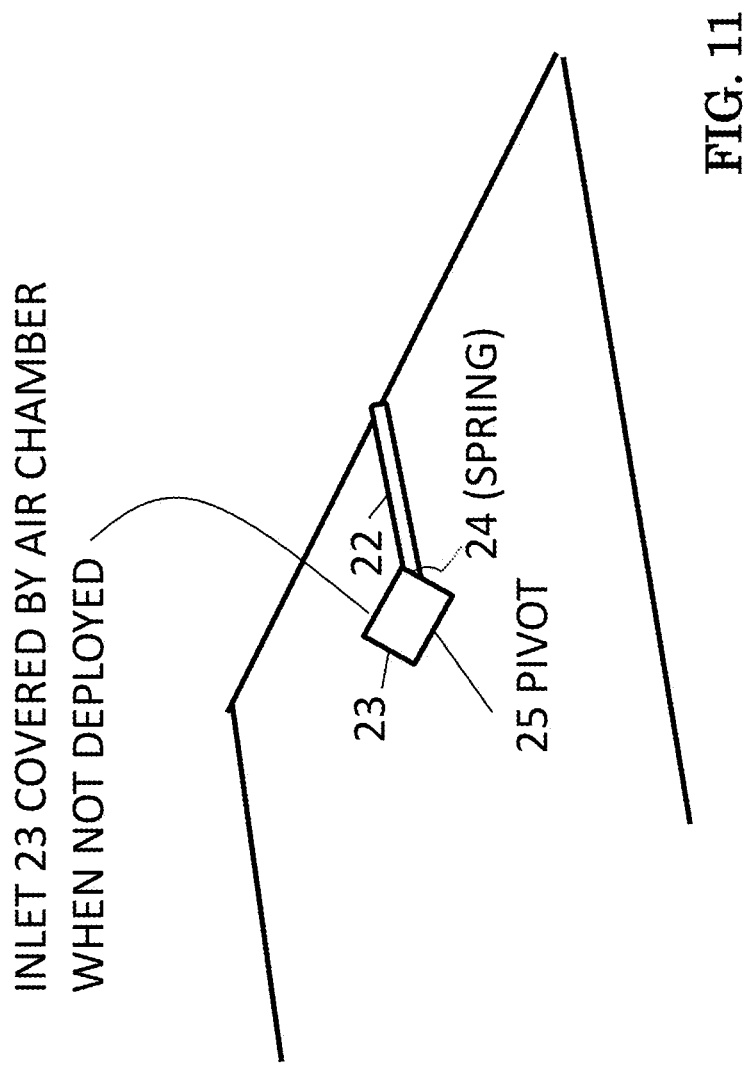
FIG. 11 is a schematic illustration of a preferred embodiment vehicle extender comprising an inflatable chamber 21 and an air intake 22, further comprising a pivotable inlet 23 biased by a spring 24.

FIG. 11 is a schematic illustration of a preferred embodiment vehicle extender comprising an inflatable chamber 21 and an air intake 22, further comprising a pivotable inlet 23 biased by a spring 24. As the vehicle moves, air flows into the inlet 23 and into inflatable chamber 21.

Figure 12:
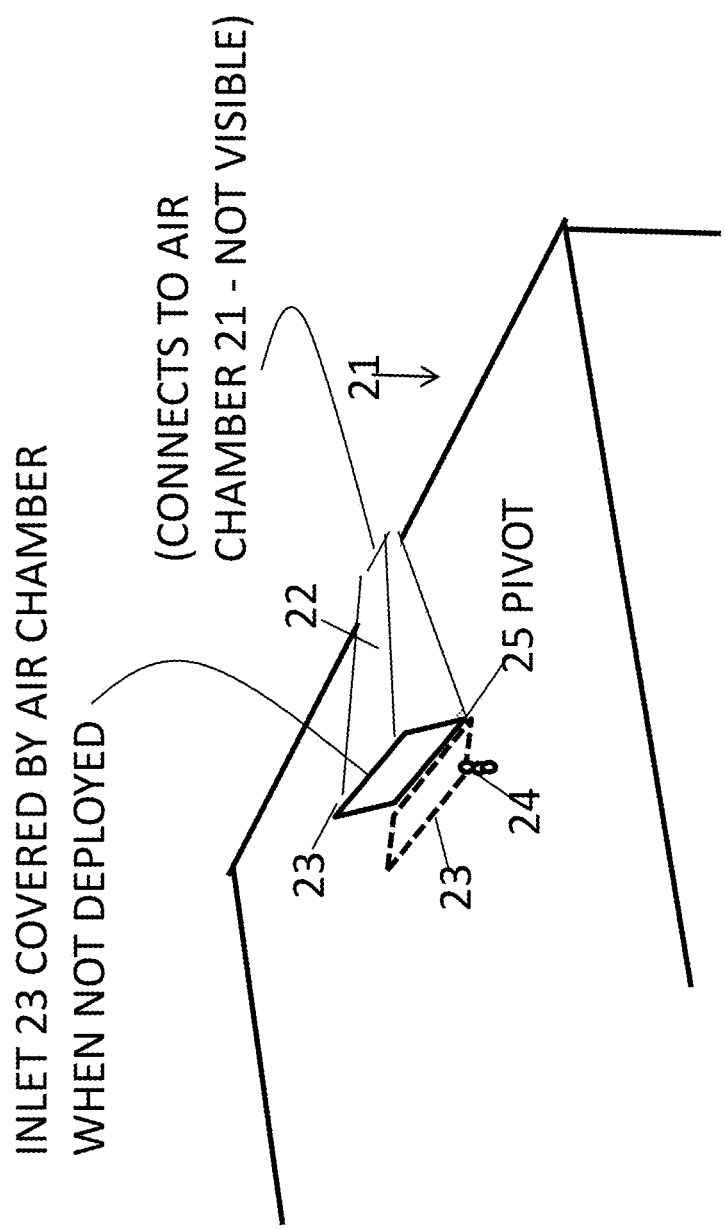
FIG. 12 is a schematic illustration of a preferred embodiment vehicle extender comprising an inflatable chamber 21 and an air intake 22, further comprising a pivotable inlet 23 biased by a spring 24 in a direction opposite to that of the embodiment of FIG. 11.

FIG. 12 is a schematic illustration of a preferred embodiment vehicle extender comprising an inflatable chamber 21 and an air intake 22, further comprising a pivotable inlet 23 biased by a spring 24 in a direction opposite to that of the embodiment of FIG. 11. The inlet 23 of FIG. 12 may be such that as vehicular speed increases, the opening of intake 23 is maximized. The air flows into chamber 22 into the inflatable chamber 21. When the support 31 is retracted, the support 31 covers the inlet 23 which pivots to a position substantially adjacent to the top of the vehicle. A spring is used to bias the intake 23 into opening.

Figure 13:
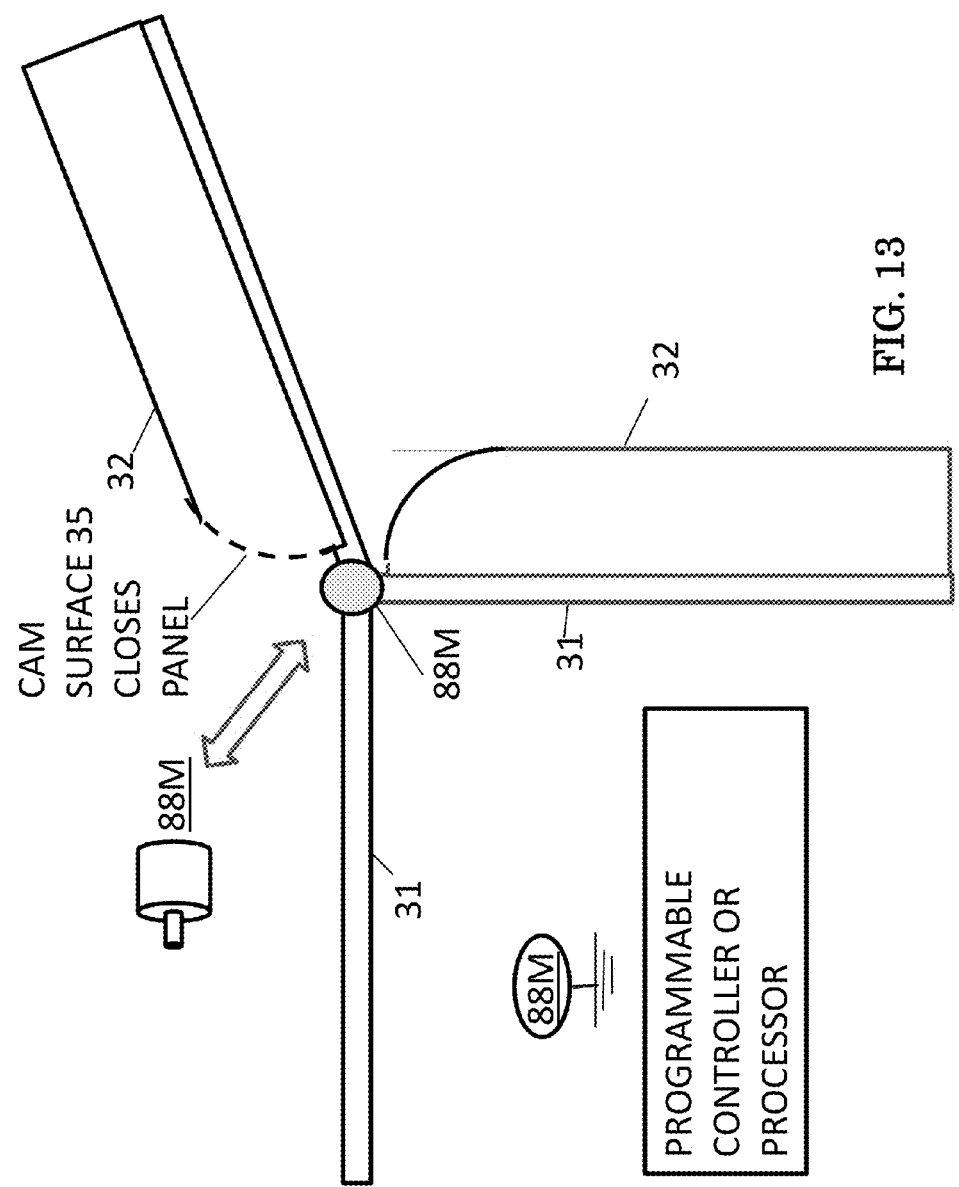
FIG. 13 is a schematic side view illustration of a preferred embodiment vehicle extender comprising panels 32, 33 (not shown).

FIG. 13 is a schematic side view illustration of a preferred embodiment vehicle extender comprising panels 32, 33 (not shown). The panels 32, 33 include a top curvature which effectively cams the panels 32, 33 into closure against the support 31. Support 31 may be pivotably driven by a motor 88M. The motor 88M may be reversible and optionally controlled by the operator of the vehicle from inside the interior of the vehicle. Optionally, a programmer/controller may be used to operate the motor only when the vehicle is stopped and there ample clearance for the support 31 from a deployed position to a retracted position. A sensor may be used to detect interference with the movement, such as the sensors which stop an elevator door when interference is detected. The programmer/controller, motor 88M and sensor may optionally included with all embodiments having support 31.

Figure 14:
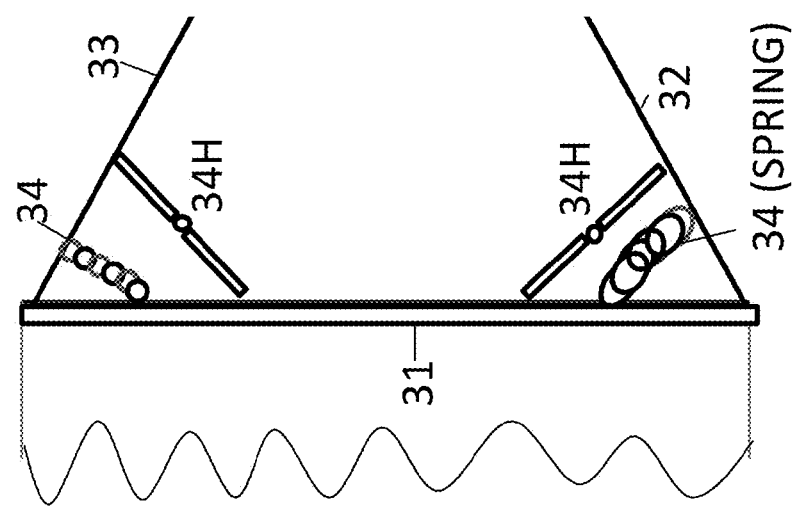
FIG. 14 is a schematic top view illustration of a preferred embodiment vehicle extender comprising panels 32, 33 biased by springs 34.

FIG. 14 is a schematic top view illustration of a preferred embodiment vehicle extender comprising panels 32, 33 biased by springs 34. The supports 34 H may comprise a hinge which limits opening or pivoting of the panels 32, 33. Springs 34 bias the panels 32, 33 into an open position. Returning again to FIG. 13, the panels 32, 33 may include a curvature on the upper portion to induce a camming effect or closure or pivoting towards the support 31 into a compact position on the vehicular top.

Figure 15:
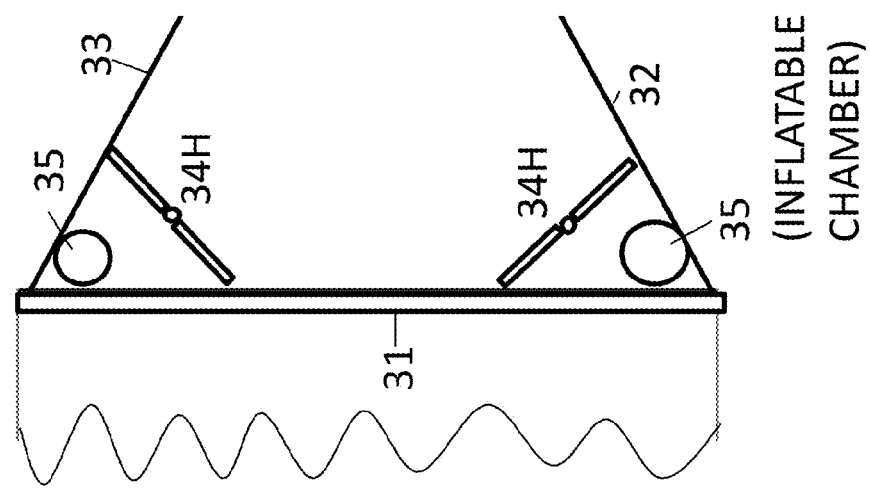
FIG. 15 is a schematic illustration of a preferred embodiment vehicle extender comprising panels 32, 33 biased by inflatable chambers or tubular elastic material elements 35.

FIG. 15 is a schematic illustration of a preferred embodiment vehicle extender comprising panels 32, 33 biased by inflatable chambers or tubular elastic material elements 35. The embodiment of FIG. 15 comprising the elements of FIG. 14 except that the springs are replaced by elastic elements 35 which may be solid elastic or an inflatable chamber.

Figure 16:
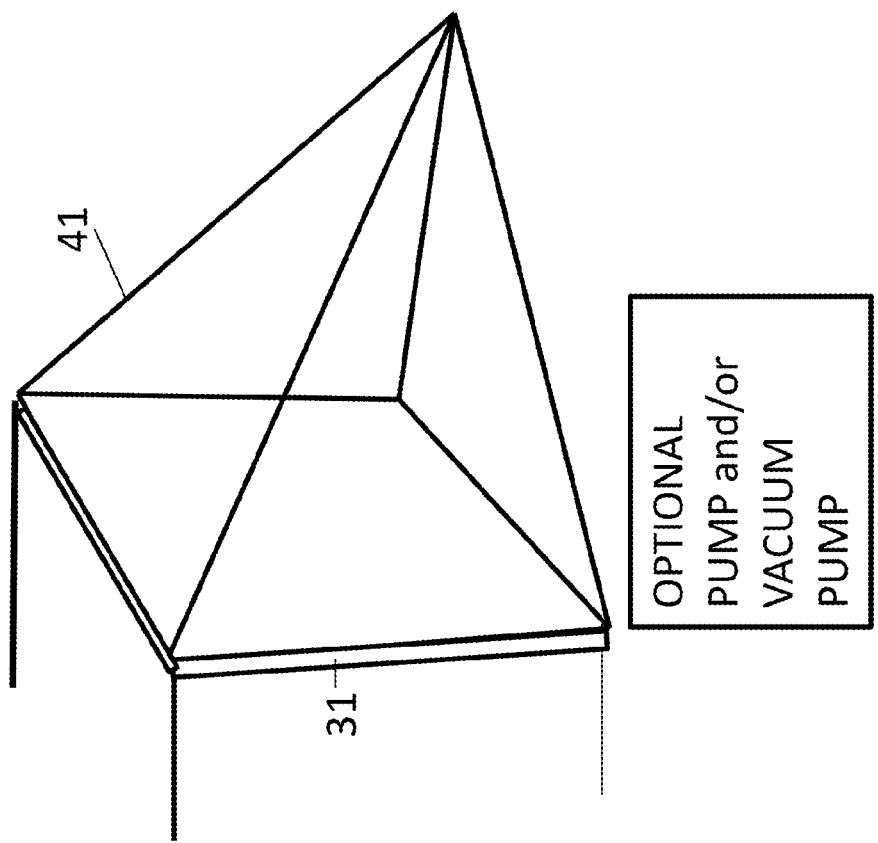
FIG. 16 is a schematic illustration of a preferred embodiment vehicle extender comprising an inflatable chamber 41 optionally positionable on a pivotable support 31.

FIG. 16 is a schematic illustration of a preferred embodiment vehicle extender comprising an inflatable chamber 41 optionally positionable on a pivotable support 31. The chamber 41 substantially resembles a pyramid.

Figure 17:
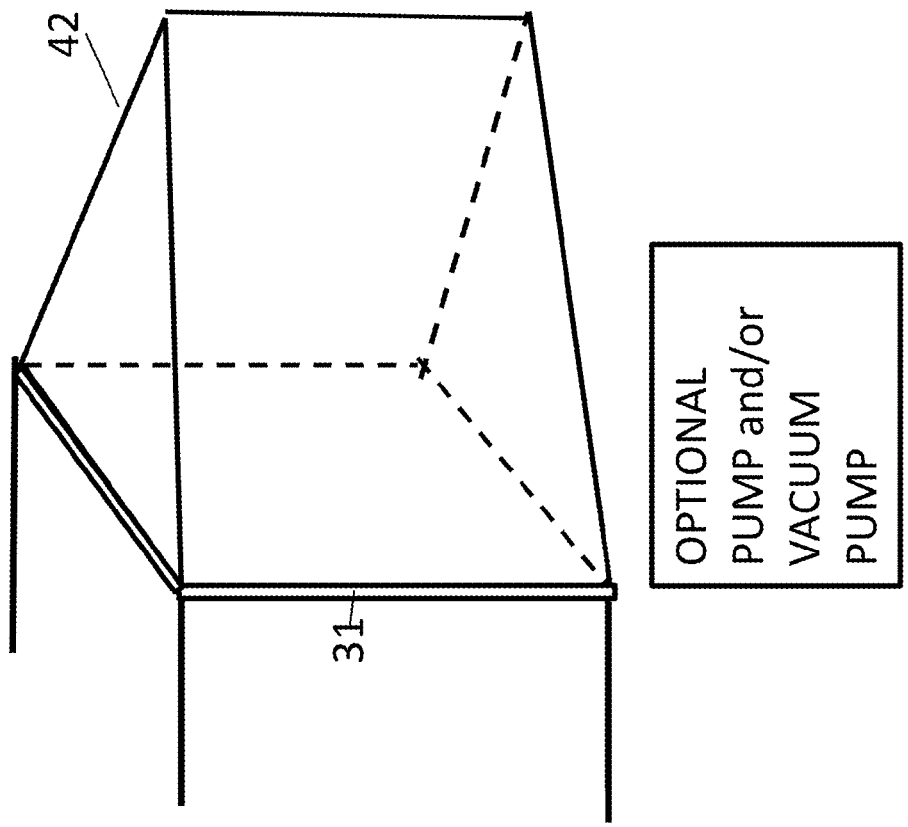
FIG. 17 is a schematic illustration of a preferred embodiment vehicle extender comprising an inflatable chamber 42 optionally positionable on a pivotable support 31.

FIG. 17 is a schematic illustration of a preferred embodiment vehicle extender comprising an inflatable chamber 42 optionally positionable on a pivotable support 31. The chamber 41 is substantially triangular in a cross-section taken in a plane parallel to the ground.

Figure 18:
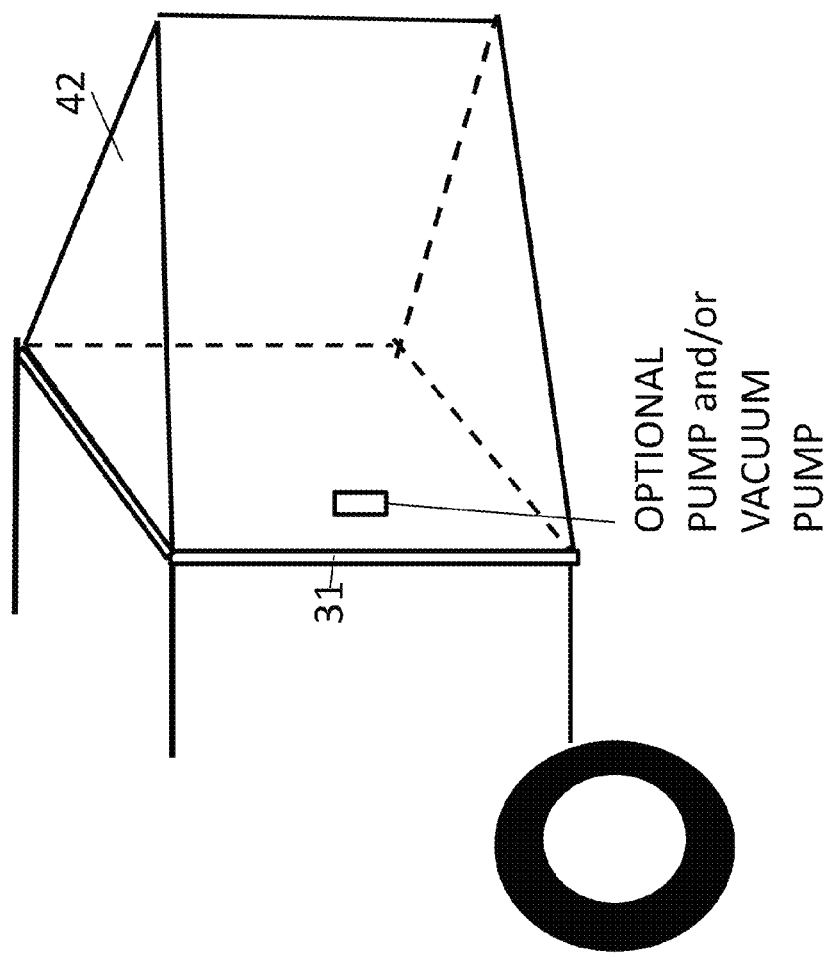
FIG. 18 is a schematic illustration of a preferred embodiment vehicle extender comprising an inflatable chamber 42 optionally positionable on a pivotable support 31 and optionally comprising a pump.

FIG. 18 is a schematic illustration of a preferred embodiment vehicle extender comprising an inflatable chamber 42 optionally positionable on a pivotable support 31 and optionally comprising a pump. All of the inflatable chambers described in this application (not having an air intake 22) may be inflated by a pump and although the pump is positioned as shown, it may be positioned anywhere on the vehicular body and connected to the chamber by tubing. All of the inflatable chambers described in this application may also have an air release associated with it for release of air, optionally under the control of the vehicle driver from within the cab. Optionally, all of the chamber may have the air sucked out of the chamber to collapse the chamber into a compact mode or form. The suction device may comprise a vacuum pump device which removes air as described in vacuum pumps at http://www.gastmfg.com/vphb/vphb_s4.pdf, and hereby incorporated by reference.

Figure 19:
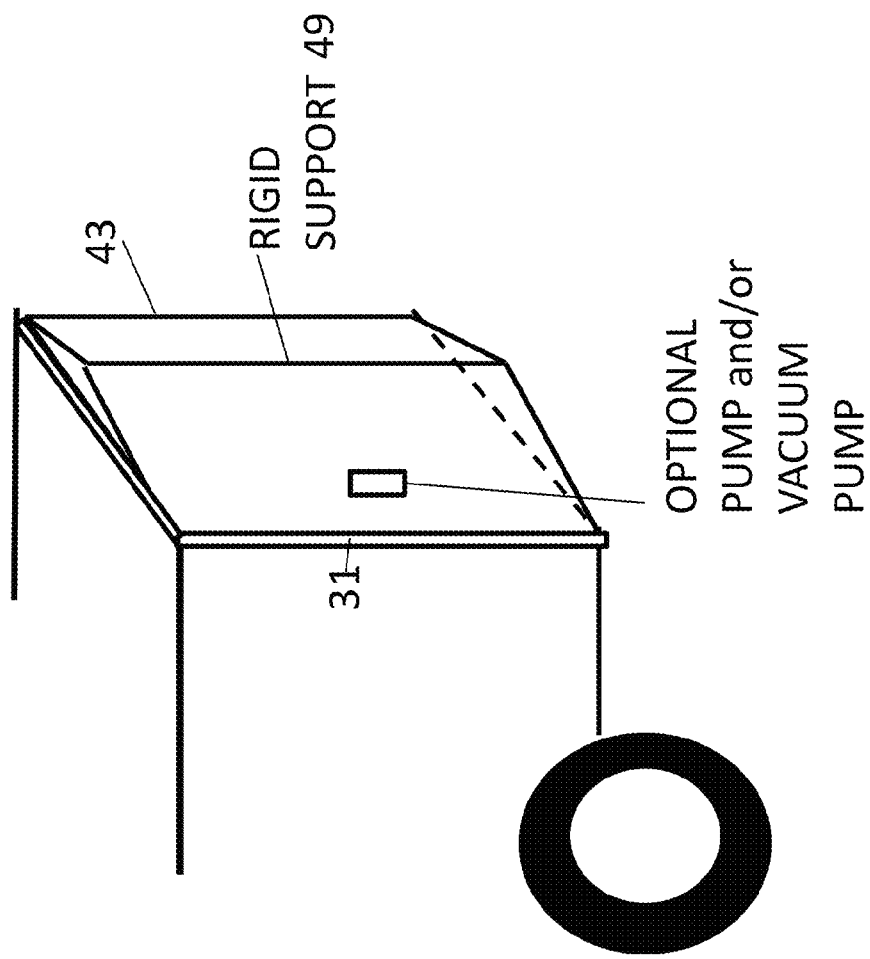
FIG. 19 is a schematic illustration of a preferred embodiment vehicle extender comprising an inflatable chamber 43 optionally positionable on a pivotable support 31 and optionally comprising a pump and a flexible or rigid middle support.

FIG. 19 is a schematic illustration of a preferred embodiment vehicle extender comprising an inflatable chamber 43 optionally positionable on a pivotable support 31 and optionally comprising a pump, vacuum pump, and a flexible or rigid middle support. As used herein the inflatable chambers 31 may be formed of an elastic material such as plastic which is expandable. Optionally, in all embodiments herein the air chamber may be formed of clear plastic or elastic material. The flexible or rigid support may be a plastic support which forms an integral corner element with the expandable plastic.

Figure 20:
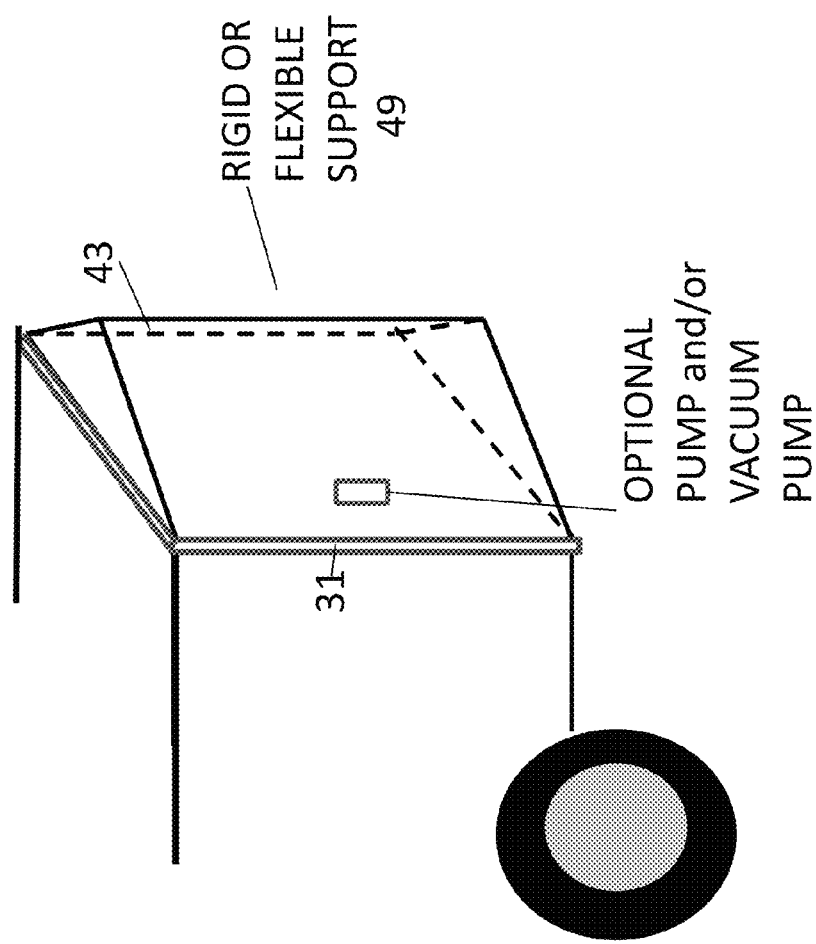
FIG. 20 is a progressive schematic illustration of the preferred embodiment vehicle extender of FIG. 19 comprising an inflatable chamber 43 optionally positionable on a pivotable support 31 and optionally comprising a pump and a flexible or rigid middle support.

FIG. 20 is a progressive schematic illustration of the preferred embodiment vehicle extender of FIG. 19 comprising an inflatable chamber 43 optionally positionable on a pivotable support 31 and optionally comprising a pump and a flexible or rigid middle support.

Figure 21:
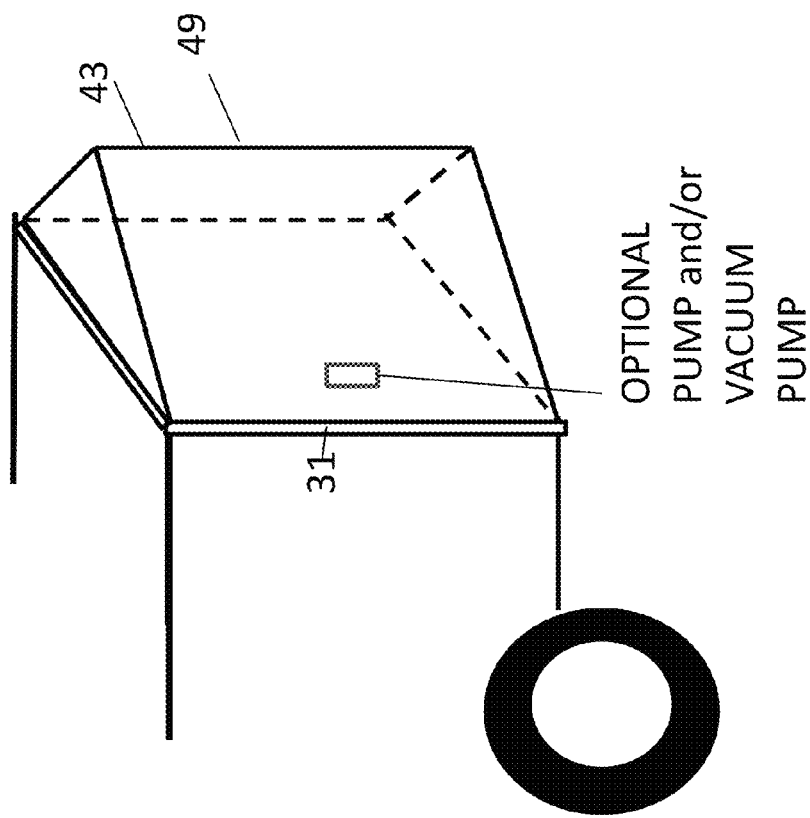
FIG. 21 is a progressive schematic illustration of the preferred embodiment vehicle extender of FIG. 19 comprising an inflatable chamber 43 optionally positionable on a pivotable support 31 and optionally comprising a pump and a flexible or rigid middle support.

FIG. 21 is a progressive schematic illustration of the preferred embodiment vehicle extender of FIG. 19 comprising an inflatable chamber 43 optionally positionable on a pivotable support 31 and optionally comprising a pump and a flexible or rigid middle support.

Figure 22:
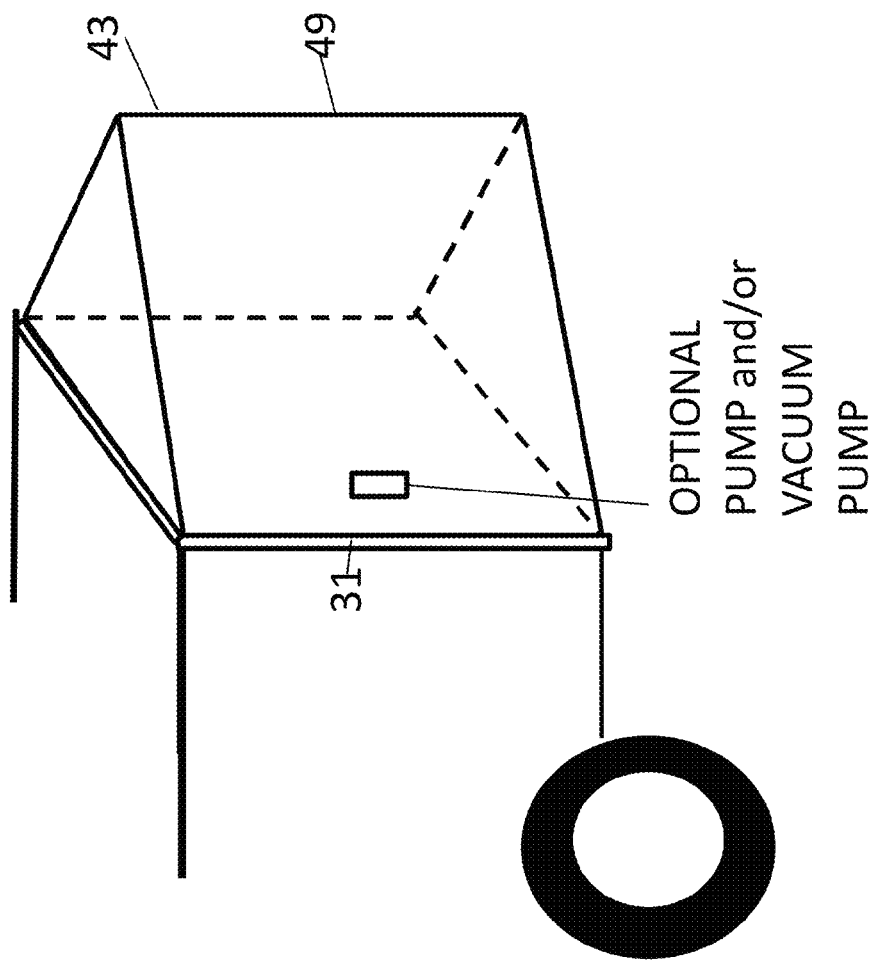
FIG. 22 is a progressive schematic illustration of the preferred embodiment vehicle extender of FIG. 19 comprising an inflatable chamber 43 optionally positionable on a pivotable support 31 and optionally comprising a pump and a flexible or rigid middle support.

FIG. 22 is a progressive schematic illustration of the preferred embodiment vehicle extender of FIG. 19 comprising an inflatable chamber 43 optionally positionable on a pivotable support 31 and optionally comprising a pump and/or vacuum pump and/or a flexible or rigid middle support.

Figure 23:
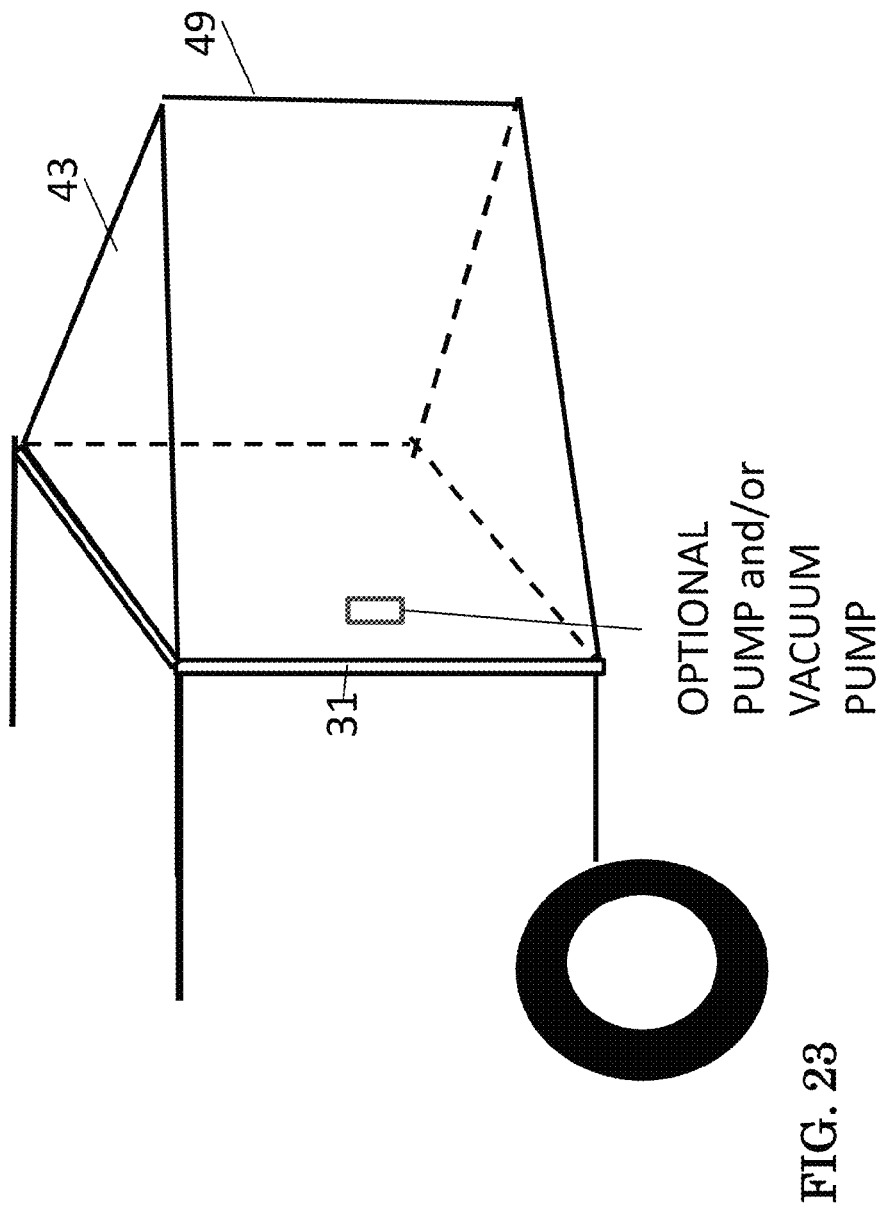
FIG. 23 is a progressive schematic illustration of the preferred embodiment vehicle extender of FIG. 19 comprising an inflatable chamber 43 optionally positionable on a pivotable support 31 and optionally comprising a pump and a flexible or rigid middle support.

FIG. 23 is a progressive schematic illustration of the preferred embodiment vehicle extender of FIG. 19 comprising an inflatable chamber 43 optionally positionable on a pivotable support 31 and optionally comprising a pump and a flexible or rigid middle support.

Figure 24:
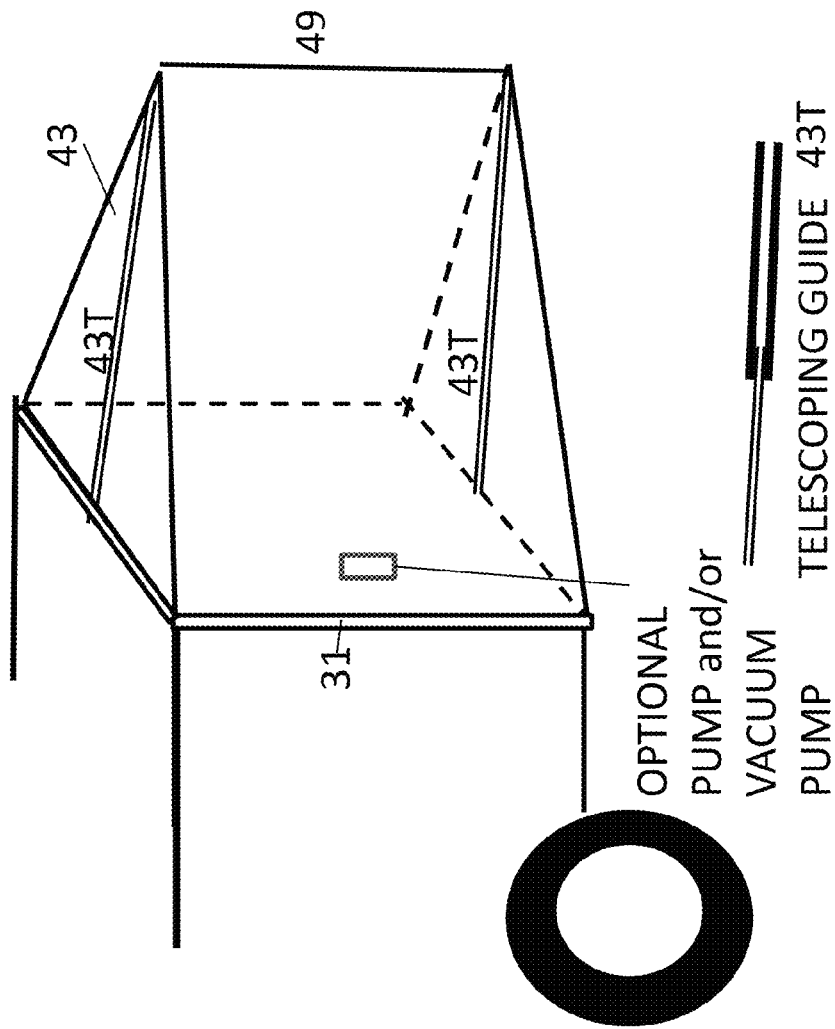
FIG. 24 is a schematic illustration of the preferred embodiment vehicle extender of FIG. 19 comprising an inflatable chamber 43 optionally positionable on a pivotable support 31 and optionally comprising a pump and a flexible or rigid middle support and optionally comprising telescoping guides.

FIG. 24 is a schematic illustration of the preferred embodiment vehicle extender of FIG. 19 comprising an inflatable chamber 43 optionally positionable on a pivotable support 31 and optionally comprising a pump and a flexible or rigid middle support and optionally comprising telescoping guides 83T. The telescopic guides may be driven by hydraulically or electronically by solenoid.

Figure 25:
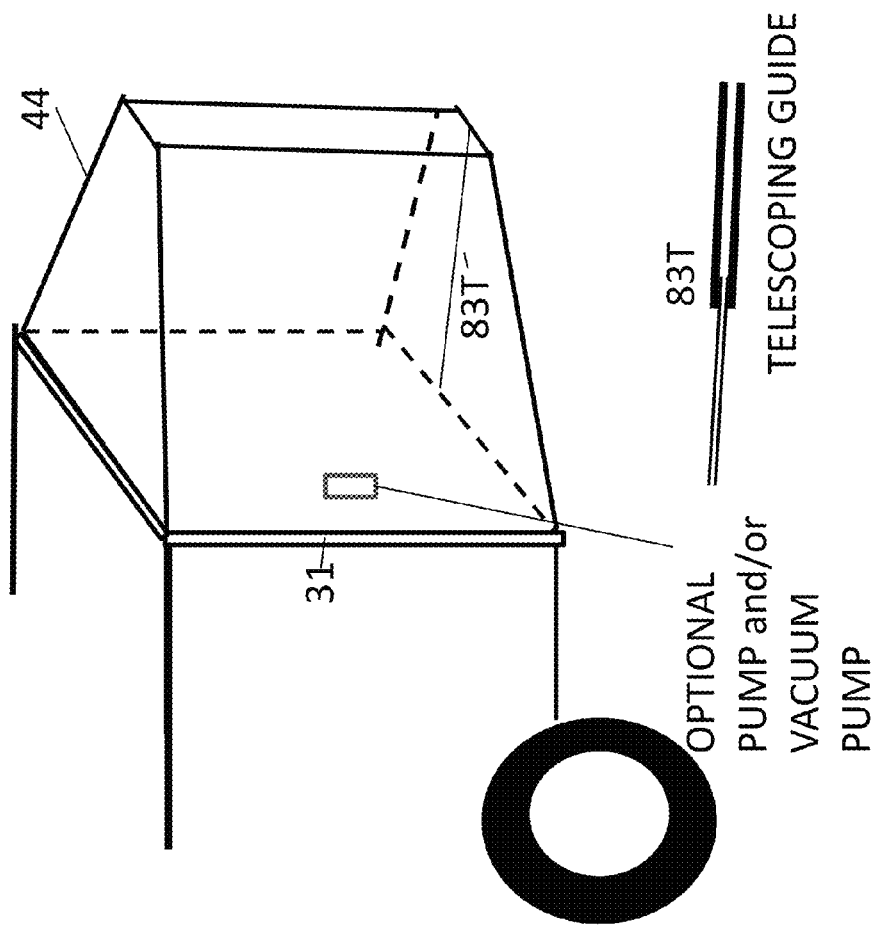
FIG. 25 is a schematic illustration of the preferred embodiment vehicle extender comprising an inflatable chamber 44 optionally positionable on a pivotable support 31 and optionally comprising a pump and a middle support and optionally comprising telescoping guides.

FIG. 25 is a schematic illustration of the preferred embodiment vehicle extender comprising an inflatable chamber 44 optionally positionable on a pivotable support 31 and optionally comprising a pump and a middle support and optionally comprising telescoping guides. The telescopic guides may be driven by hydraulically or electronically by solenoid.

Figure 26:
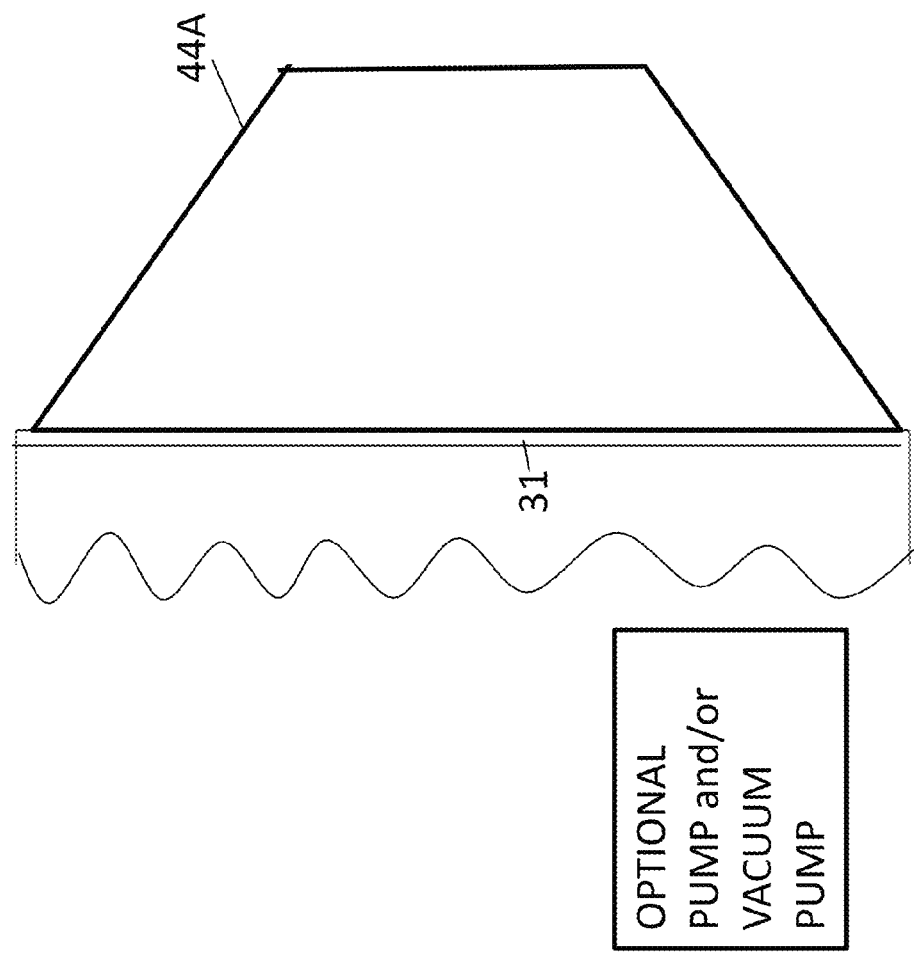
FIG. 26 is a side view schematic illustration of the preferred embodiment vehicle extender comprising an inflatable chamber 44A optionally positionable on a pivotable support 31 and optionally comprising a pump and a middle support and optionally comprising telescoping guides (not shown).

FIG. 26 is a side view schematic illustration of the preferred embodiment vehicle extender comprising an inflatable chamber 44A optionally positionable on a pivotable support 31 and optionally comprising a pump and/or vacuum pump and/or a middle support and optionally comprising telescoping guides (not shown).

Figure 27:
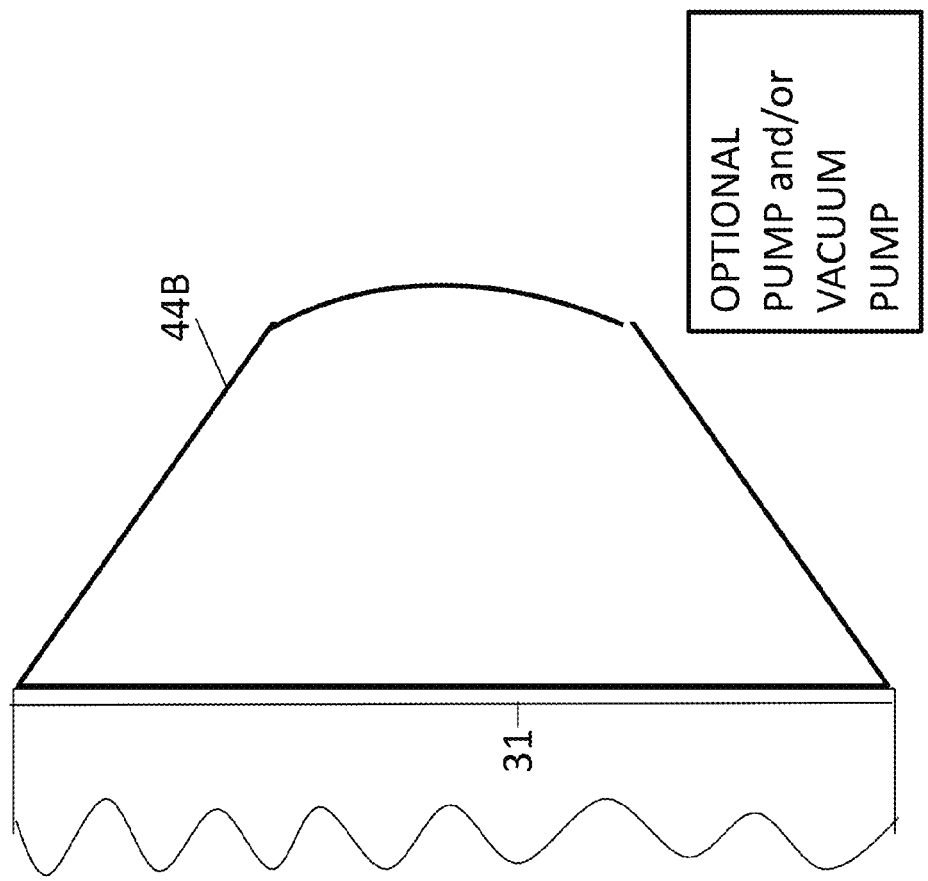
FIG. 27 is a side view schematic illustration of the preferred embodiment vehicle extender comprising inflatable chamber 44B optionally positionable on a pivotable support 31 and optionally comprising a pump and optionally comprising telescoping guides (not shown).

FIG. 27 is a side view schematic illustration of the preferred embodiment vehicle extender comprising inflatable chamber 44B optionally positionable on a pivotable support 31 and optionally comprising a pump, and/or vacuum pump and optionally comprising telescoping guides (not shown).

Figure 28:
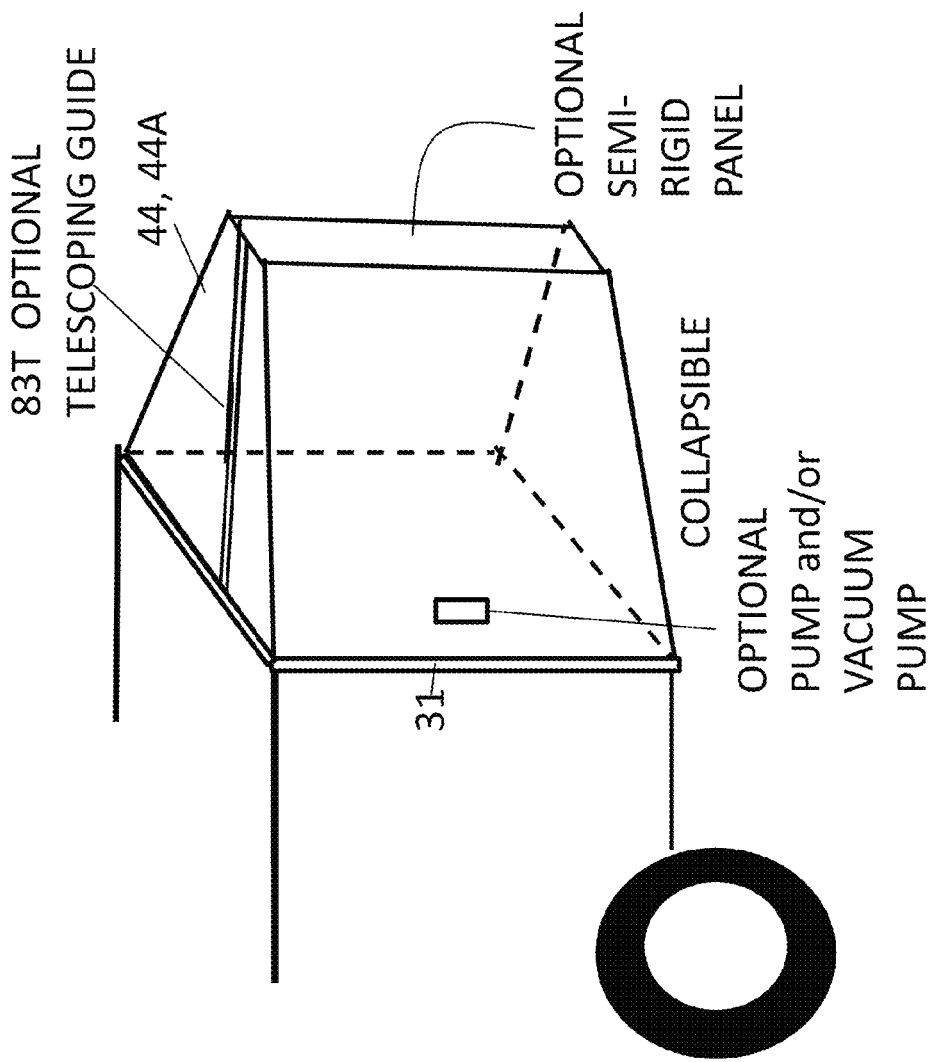
FIG. 28 is a schematic illustration of the preferred embodiment vehicle extender comprising inflatable chamber 44 or 44A optionally positionable on a pivotable support 31 and optionally comprising a pump and optionally comprising telescoping guides and a semi-rigid center panel.

FIG. 28 is a schematic illustration of the preferred embodiment vehicle extender comprising inflatable chamber 44 or 44A optionally positionable on a pivotable support 31 and optionally comprising a pump and optionally comprising telescoping guides and a semi-rigid center panel. The optional telescopic guides 83T in FIGS. 25 and 28 facilitate the extension and withdrawal of the end of the chamber. The optional telescopic guides may be powered hydraulically or electronically by a solenoid. Optionally a rear panel may be retracted towards the rear of the vehicle upon actuation/operation of one or more telescopic guides 83T. In all embodiments herein containing an optional panel in the rear, the panel may be plastic, aluminum or the like and, if plastic, may be clear vinyl.

Figure 29:
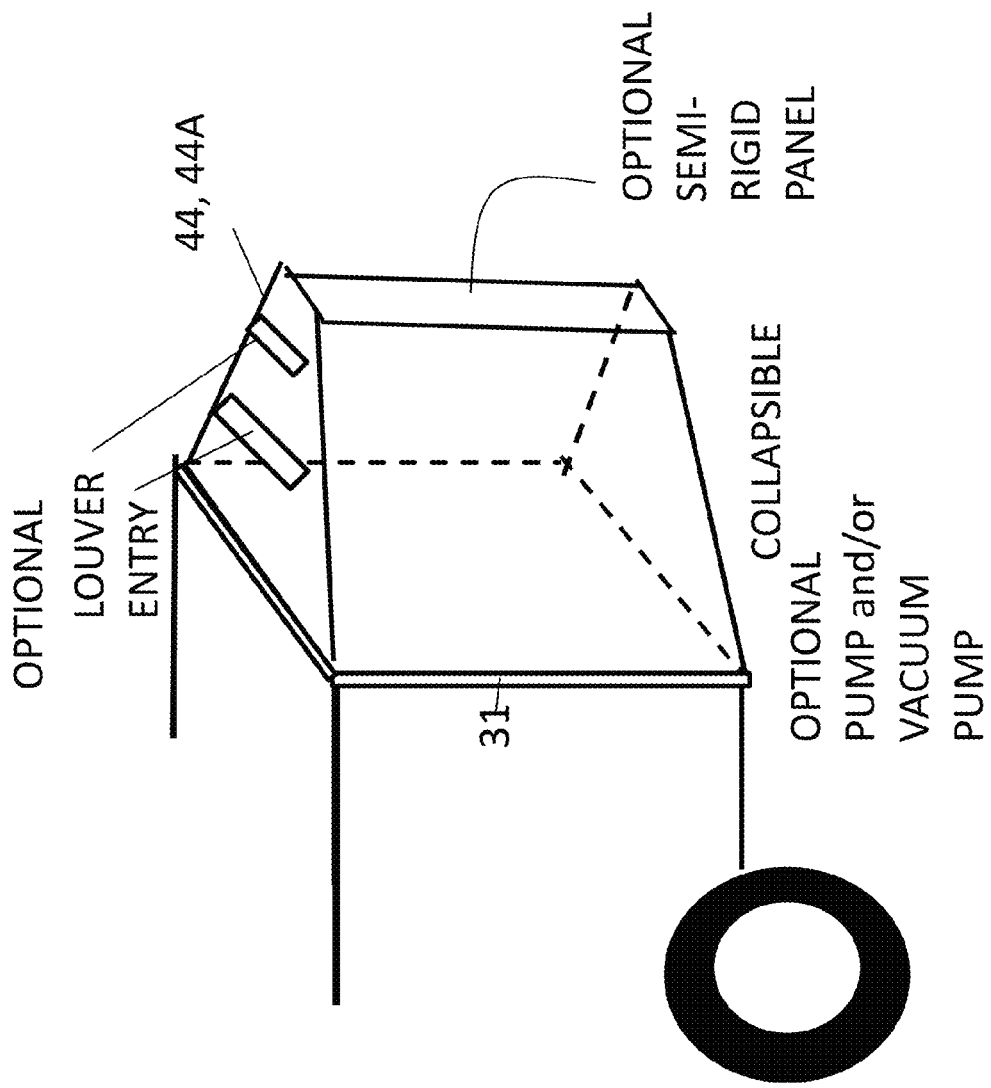
FIG. 29 is a schematic illustration of the preferred embodiment vehicle extender comprising inflatable chamber 44 or 44A optionally positionable on a pivotable support 31 and optionally comprising louvered air inlets and optionally comprising telescoping guides (not shown) and a semi-rigid center panel.

FIG. 29 is a schematic illustration of the preferred embodiment vehicle extender comprising inflatable chamber 44 or 44A optionally positionable on a pivotable support 31 and optionally comprising louvered air inlets and optionally comprising telescoping guides (not shown) and a semi-rigid center panel. The air inlets may be optionally controlled by solenoids for opening and closure which may optionally controlled inside of the vehicle by the driver.

Figure 30:
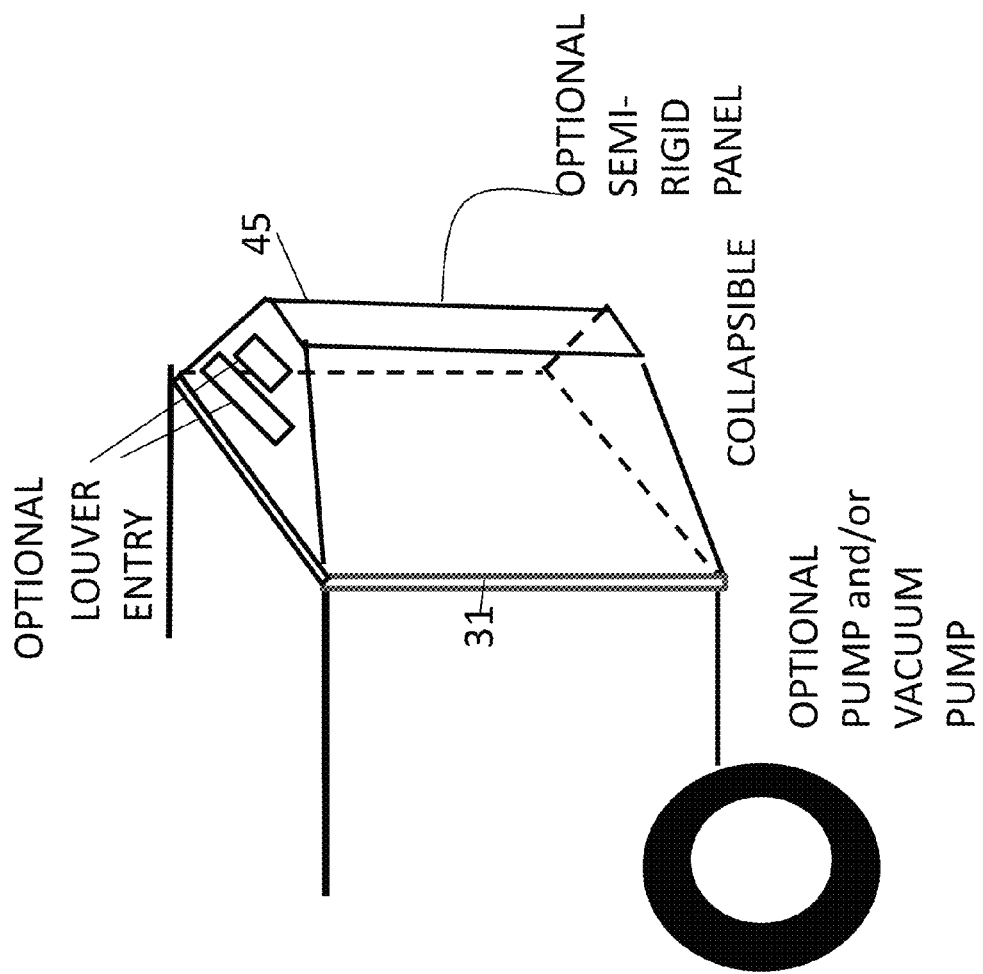
FIG. 30 is a schematic illustration of the preferred embodiment vehicle extender comprising inflatable chamber 45 optionally positionable on a pivotable support 31 and optionally comprising louvered air inlets and optionally comprising telescoping guides (not shown) and a semi-rigid center panel.

FIG. 30 is a schematic illustration of the preferred embodiment vehicle extender comprising inflatable chamber 45 optionally positionable on a pivotable support 31 and optionally comprising louvered air inlets and optionally comprising telescoping guides (not shown) and a semi-rigid center panel. The inflatable chamber is inflated by air flow entering the cavity as the vehicle moves, the entering air extending the cavity to a desired shape to create an aerodynamic effect when the inflatable chamber inflates and operating to collapse into a retracted position when the vehicle is not moving. In the retracted position, the exterior of the inflatable chamber optionally extends a maximum of six inches from the support 31. The air inlets may be optionally controlled by solenoids for opening and closure which may optionally controlled inside of the vehicle by the driver. The chamber may be collapsed using a vacuum pump as described herein.

Figure 31:
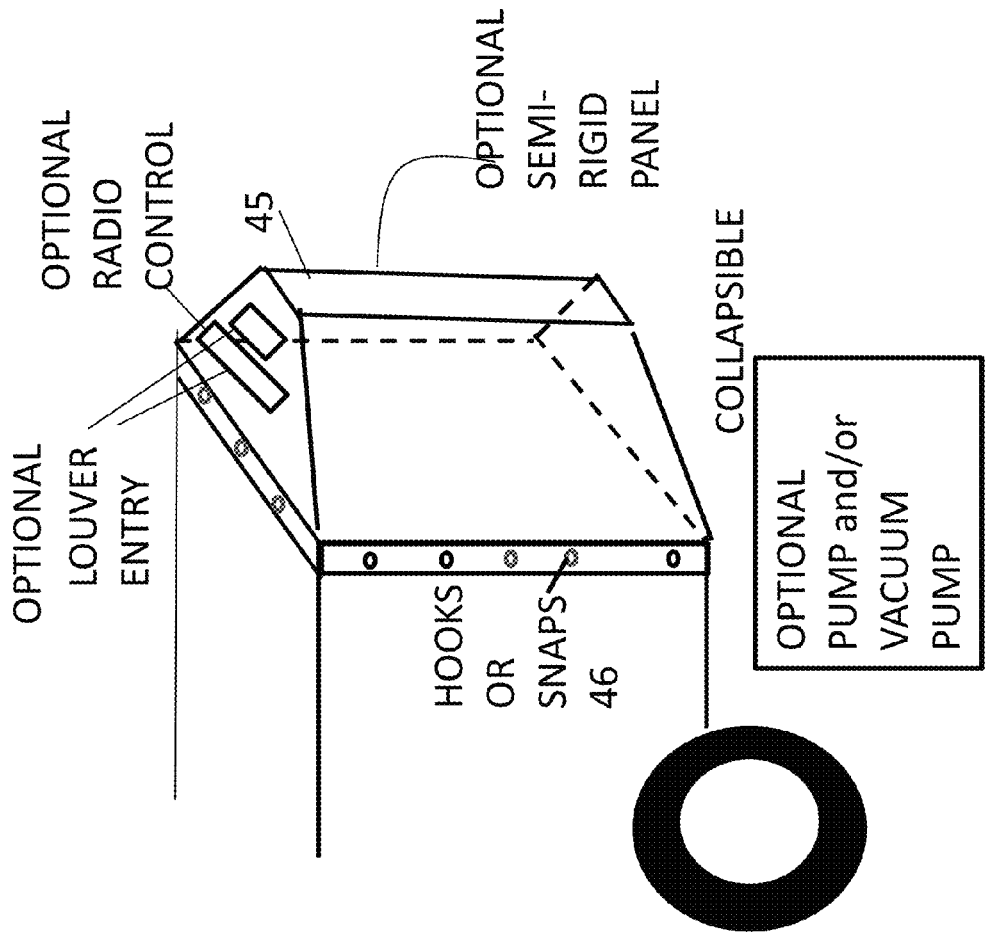
FIG. 31 is a schematic illustration of the preferred embodiment vehicle extender comprising a detachable inflatable chamber 45 optionally positionable on a pivotable support 31 and optionally comprising louvered air inlets that are motor driven by a radio controlled motor and optionally comprising telescoping guides (not shown) and a semi-rigid center panel.

FIG. 31 is a schematic illustration of the preferred embodiment vehicle extender comprising a detachable inflatable chamber 45 optionally positionable on a pivotable support 31 and optionally comprising louvered air inlets that are motor driven by a radio controlled motor and optionally comprising telescoping guides (not shown) and a semi-rigid center panel. The air chamber shown may be attached to the vehicle by hooks or snaps 46. Optionally a hook and loop fastener (under the trademark Velcro) may be used. Instead of louvers, a pump and vacuum pump may be used to inflate and deflate the chamber 45.

Figure 32:
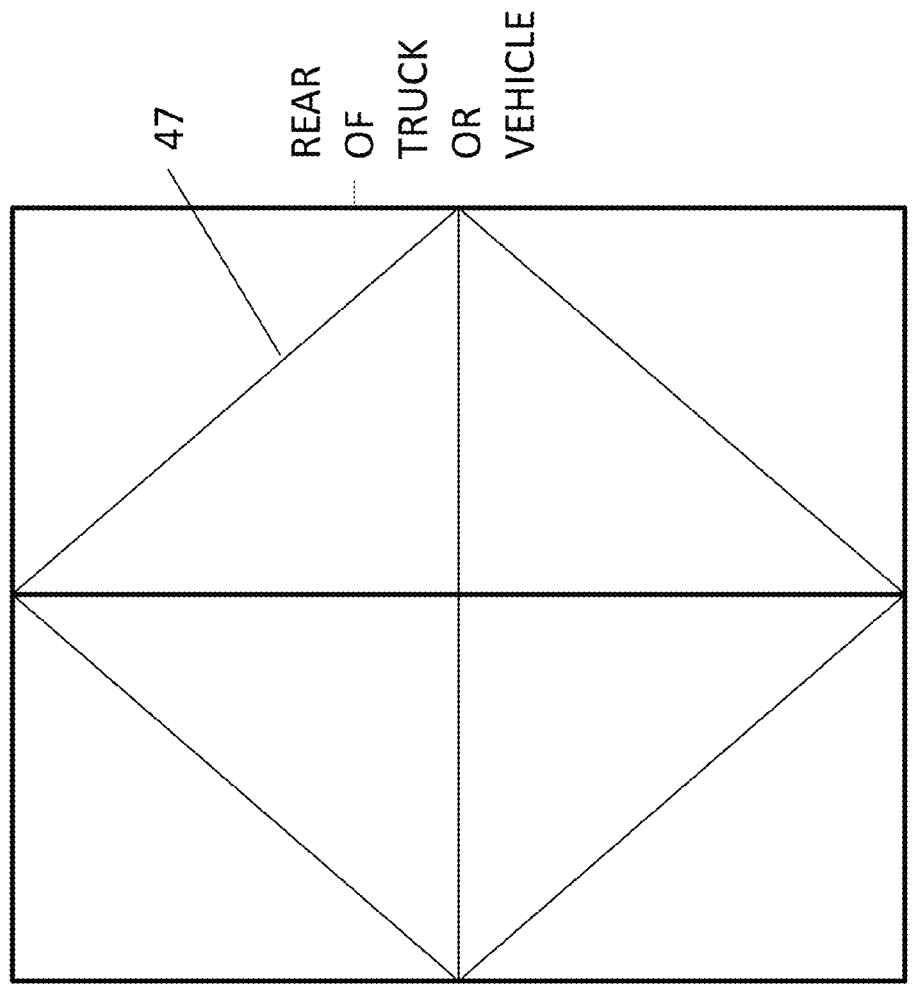
FIG. 32 is a schematic illustration of the preferred embodiment vehicle extender 47 having sides positioned on the trailer doors.

FIG. 32 is a schematic illustration of the preferred embodiment vehicle extender 47 having sides positioned on the trailer doors. The two sides may be separately mounted so that each is placed on a door of the vehicle so that the doors may be moved or pivoted while the chamber halves are in place.

Figure 33:
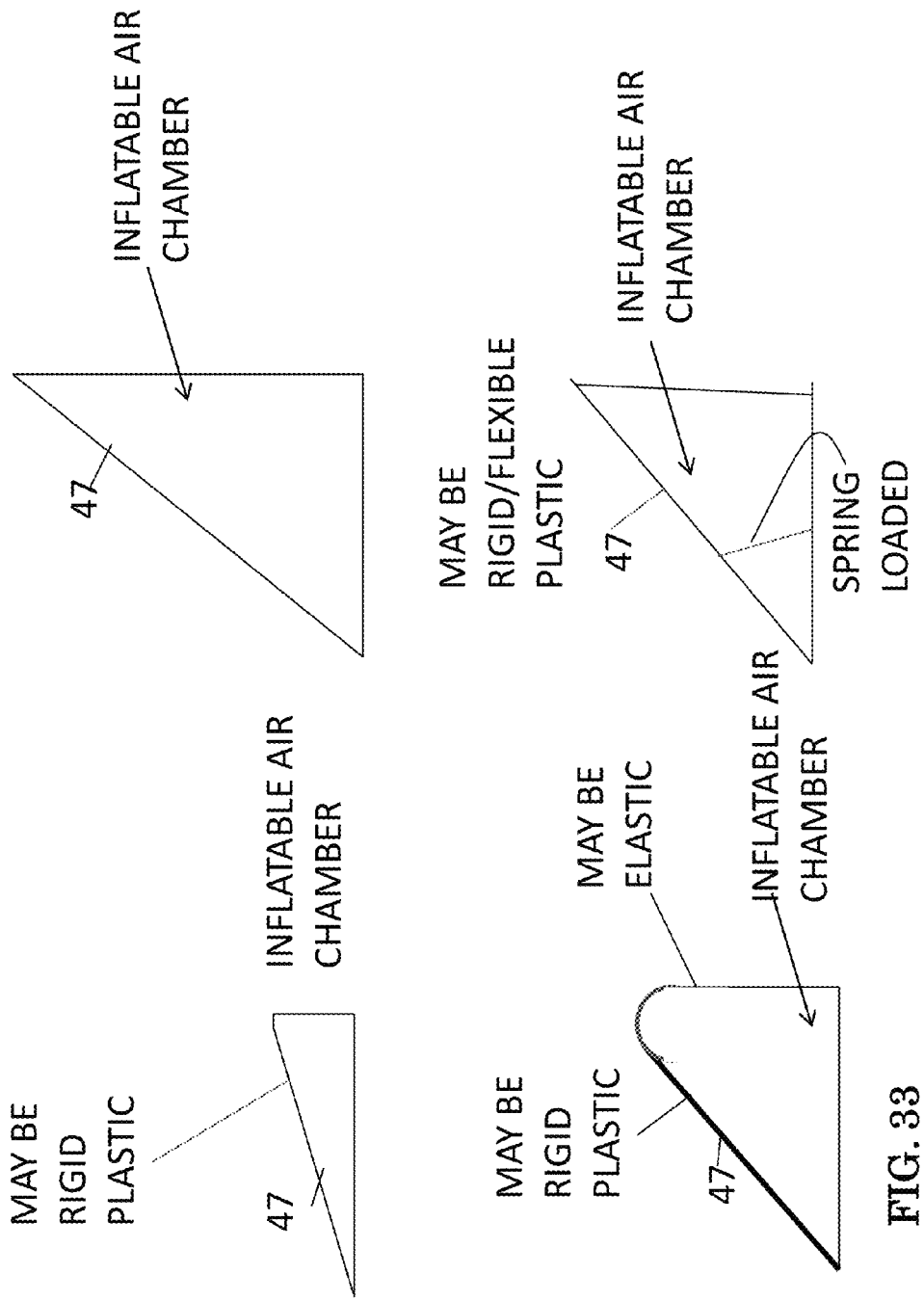
FIG. 33 is a schematic illustration of optional cross sections the preferred embodiment vehicle extender having sides positioned on the trailer doors.

FIG. 33 is a schematic illustration of optional cross sections the preferred embodiment vehicle extender 47 having sides positioned on the trailer doors.

FIG. 34 is a schematic illustration of the preferred embodiment vehicle extender 47 showing only a single trailer door of the embodiment of FIG. 32.

FIG. 35 is a top view of a schematic illustration of the preferred embodiment vehicle extender 47, 48 positioned on trailer doors.

FIG. 36 is a side view of a schematic illustration of the preferred embodiment vehicle extender 47, 48 positioned on trailer doors.

FIG. 37A is a side view of a schematic illustration of the preferred embodiment vehicle extender showing a motor 88M driven lifting assembly, comprising a hinge 53, a cable or rope 51 and pulley subassembly 52, which may be retractable or flexible. Optionally, the assembly may include a latch 55 optionally controlled by a solenoid for activation from within the vehicle interior or exterior of the vehicle.

FIG. 37B is a side view of a schematic illustration of the preferred embodiment vehicle extender of FIG. 37A in a lifted position.

FIG. 37C is a side view of a schematic illustration of the preferred embodiment vehicle extender of FIG. 37A in a ¾ lifted position.

FIG. 37D is a side view of a schematic illustration of the preferred embodiment vehicle extender of FIG. 37A in a retracted position.

FIG. 38A is a side view of a schematic illustration of the preferred embodiment vehicle extender showing assembly 60, 61. The support 31A rolls up into chamber 61 which may be cylindrical in shape. The roll up may resemble that of a window shade, and may comprise springs which induce the roll-up. The support 31A may for example be a sheet of flexible plastic, such as vinyl plastic, which may optionally be clear. The embodiment may optionally include a pump for inflating and/or a vacuum pump for withdrawal of the air, as described in the foregoing. The housing 61 may be removably attached to the vehicle exterior at or below the top surface of the vehicle. The housing 61 may be attached by bolts, welded or screws or the like.

FIG. 38B is a side view of a schematic illustration of the preferred embodiment vehicle extender of FIG. 38A in a deployed position, prior to inflation of the air chamber, which may take the configuration of any of the embodiments described above.

FIG. 39 a perspective view of a schematic illustration of the preferred embodiment vehicle extender of FIG. 38A, further comprising hooks and loop fasteners for attachment of the support 31 to the vehicle rear. Optionally a latch may be included for maintaining the position of the support 31, which may optionally be solenoid controlled.

FIG. 40 a perspective view of a schematic illustration of the preferred embodiment vehicle extender of FIG. 38A prior to inflation.

FIG. 41 a perspective view of a schematic illustration of the preferred embodiment vehicle extender of FIG. 38A prior to inflation showing channels 62A. The support 31 is constrained by the U-shaped channels to secure the support 31 against the back of the vehicle. Optionally, the channels 62A may be removably mounted (such as by screws or bolts) to the vehicle rear.

FIG. 42 a perspective view of a schematic illustration of the preferred embodiment vehicle extender of FIG. 38A after inflation; the configuration may be any one of 21, 41, 42, 43, 44A, 44B, 47, 48, and the chamber may be inflated by an air inlet, such as for example, as shown in FIG. 12 or a pump and/or vacuum pump, as described in the foregoing.

Figure 43:
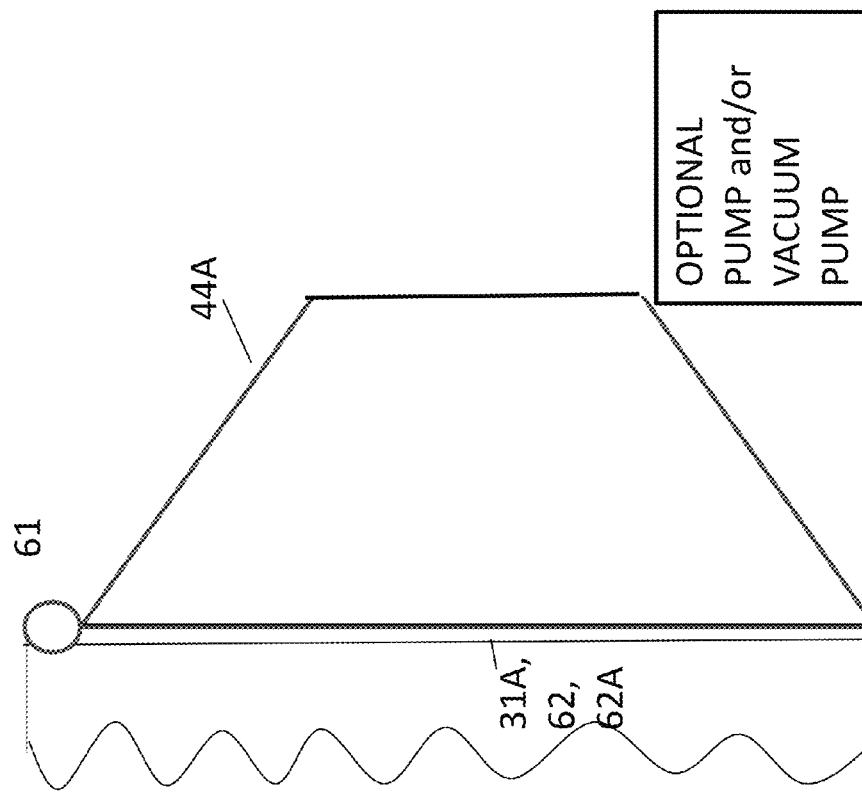
FIG. 43 a perspective view of a schematic illustration of the preferred embodiment vehicle extender of 44A after inflation

FIG. 43 is a perspective view of a schematic illustration of the preferred embodiment vehicle extender 44A after inflation. The configuration may be any one of 21, 41, 42, 43, 44A, 44B, 47, 48, and the chamber may be inflated by an air inlet, such as for example, as shown in FIG. 12 or a pump and/or vacuum pump, as described in the foregoing FIG. 44A is a schematic illustration of an assembly 61 comprising a reversible motor 63.

FIG. 44B is a schematic illustration of an assembly 61 comprising a coiled spring drive 63A.

FIG. 44c is a schematic illustration of an assembly 61 comprising a cogged drive 63B. The belt 64 may be pulled by hand or powered by a motor (not shown). The term cogged means of a nature similar to a fan belt drive on a 1985 Ford or the like.

As used herein the terminology "processor" or "controller" as used herein may be a microprocessor, computer, programmable controller, programmable chip, multiprocessor, personal computer, CPU, coprocessor, central processor, or the like.

As used herein the terminology "external" means external to the vehicle.

As used herein, the terminology "deployed position" means a position where the aerodynamic effect to reduce vehicle drag occurs.

As used herein, the terminology "rolls" or "reels" means to form roll, a spool or scroll in which the surface is coiled around a central support.

As used herein, the terminology "vehicle" includes the trailer of a vehicle; such as the apparatus may be affixed to the top of a trailer of a vehicle.

As used herein, the terminology "axis" means a line about which a body or geometric object rotates. The axis may comprise, for example, a rod, rotating support, or pivoting support.

As used herein the terminology "wake" refers to the flow of air behind a vehicle.

Embodiments of the present invention are described herein are schematic illustrations of idealized embodiments of the present invention. As such, variations from the shapes of the illustrations as a result, for example, of manufacturing techniques and/or tolerances, are to be expected. The embodiments of the present invention should not be construed as limited to the particular shapes of displays illustrated herein but are to include deviations in shapes that result, for example, from manufacturing.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An apparatus for converting a substantially flat vehicular surface on the rear of a vehicle so as to create at least one surface which operates to reduce aerodynamic drag, comprising:
    at least one support adapted to pivot relative to the rear surface of a vehicle;
    at least one surface supported by the at least one support; the at least one surface comprising the surface of an inflatable chamber; the inflatable chamber comprising louvered air inlets operatively connected to solenoids; the inflatable chamber being inflated by the louvered air inlets that are controlled by the solenoids;
    the at least one surface movably positioned so as to move from a deployed position extending from the rear of a vehicle to a retracted position;
    whereby the apparatus operates to reduce aerodynamic drag in the deployed position and does not interfere with vehicle loading in the retracted position.

2. The apparatus of claim 1 wherein the at least one surface operates to reduce the vehicle's wake and lessen total aerodynamic drag force.

3. The apparatus of claim 1 wherein the at least one surface comprises the surface of an inflatable chamber and wherein the at least one support pivots from a position to the rear of the vehicle to a position on top of the vehicle.

4. The apparatus of claim 3 wherein the inflatable chamber has a cross-section which when viewed in a plane parallel to the ground in the deployed position resembles or approximates a trapezoid and wherein the at least one surface comprises a semirigid panel.

5. The apparatus of claim 3 wherein the inflatable chamber is inflated by air flow entering the cavity as the vehicle moves, the entering air extending the cavity to a desired shape to create an aerodynamic effect when the inflatable chamber inflates and operating to collapse into a retracted position when the vehicle is not moving.

\* \* \* \* \*